(12) United States Patent
Garnett et al.

(10) Patent No.: US 6,701,289 B1
(45) Date of Patent: Mar. 2, 2004

(54) METHOD AND APPARATUS FOR USING A PLACEMENT TOOL TO MANIPULATE CELL SUBSTITUTION LISTS

(75) Inventors: Robert E. Garnett, Roseville, MN (US); Joseph P. Kerzman, New Brighton, MN (US); James E. Rezek, Mounds View, MN (US); Mark D. Aubel, Essex Jct., VT (US)

(73) Assignee: Unisys Corporation, Blue Bell, PA (US)

( * ) Notice: Subject to any disclaimer, the term of this patent is extended or adjusted under 35 U.S.C. 154(b) by 1060 days.

(21) Appl. No.: 08/789,029

(22) Filed: Jan. 27, 1997

(51) Int. Cl.$^7$ ............................. G06F 17/50; G06F 9/45
(52) U.S. Cl. ................................. 703/14; 716/8; 716/9; 716/10; 716/11; 716/12; 716/13; 716/14
(58) Field of Search ................................ 364/488, 489, 364/490, 491; 716/8–14; 703/14

(56) References Cited

U.S. PATENT DOCUMENTS

| | | | |
|---|---|---|---|
| 4,758,953 A | | 7/1988 | Morita et al. |
| 4,831,543 A | | 5/1989 | Mastellone |
| 4,882,690 A | * | 11/1989 | Shinsha et al. ............. 364/490 |
| 4,918,614 A | | 4/1990 | Modarres et al. |
| 5,043,914 A | * | 8/1991 | Nishiyama et al. ......... 364/488 |
| 5,050,091 A | | 9/1991 | Rubin |
| 5,164,908 A | | 11/1992 | Igarashi |
| 5,175,696 A | | 12/1992 | Hooper et al. |
| 5,222,029 A | | 6/1993 | Hooper et al. |
| 5,255,363 A | | 10/1993 | Seyler |
| 5,267,175 A | | 11/1993 | Hooper |
| 5,341,309 A | | 8/1994 | Kawata |
| 5,349,659 A | | 9/1994 | Do et al. |
| 5,355,317 A | | 10/1994 | Talbott et al. |
| 5,357,440 A | | 10/1994 | Talbott et al. |
| 5,359,523 A | | 10/1994 | Talbott et al. |
| 5,359,537 A | | 10/1994 | Saucier et al. |
| 5,361,357 A | | 11/1994 | Kionka |
| 5,398,195 A | | 3/1995 | Kim |
| 5,406,497 A | | 4/1995 | Altheimer et al. |
| 5,416,721 A | | 5/1995 | Nishiyama et al. |
| 5,418,733 A | | 5/1995 | Kamijima |
| 5,418,954 A | | 5/1995 | Petrus |
| 5,436,849 A | * | 7/1995 | Drumm ...................... 364/490 |
| 5,440,720 A | | 8/1995 | Baisuck et al. |
| 5,473,547 A | * | 12/1995 | Muroga ...................... 364/489 |
| 5,483,461 A | | 1/1996 | Lee et al. |
| 5,485,396 A | | 1/1996 | Brasen et al. |
| 5,490,266 A | | 2/1996 | Sturges |
| 5,490,268 A | | 2/1996 | Matsunaga |
| 5,491,640 A | | 2/1996 | Sharma et al. |
| 5,493,508 A | | 2/1996 | Dangelo et al. |
| 5,555,201 A | * | 9/1996 | Dangelo et al. ................ 716/1 |
| 5,724,250 A | * | 3/1998 | Kerzman et al. ............... 716/3 |
| 5,726,903 A | * | 3/1998 | Kerzman et al. ........... 364/489 |
| 5,761,079 A | * | 6/1998 | Drumm ...................... 364/489 |
| 5,764,525 A | * | 6/1998 | Mahmood et al. .......... 364/488 |

OTHER PUBLICATIONS

Tufte, "CML III Bipolar Standard Cell Library", Proceedings of the 1988 Bipolar Circuits and Technology Meeting, Minneapolis, Minnesota, Sep., 1988, pp. 180–182.

* cited by examiner

Primary Examiner—Hugh Jones
(74) Attorney, Agent, or Firm—Charles A. Johnson; Mark T. Starr; Nawrocki, Rooney & Sivertson, P.A.

(57) ABSTRACT

A placement tool that may import and export cell substitution and/or cell selection lists. The cell substitution and/or cell selection lists may be used by the placement tool to substitute and/or modify the placement design database, rather than the original schematic or behavioral database. This may eliminate the need to re-synthesize the circuit design during each design iteration. The present invention further contemplates providing a reset feature which may reset the circuit design database to a previous state, if desired.

33 Claims, 19 Drawing Sheets

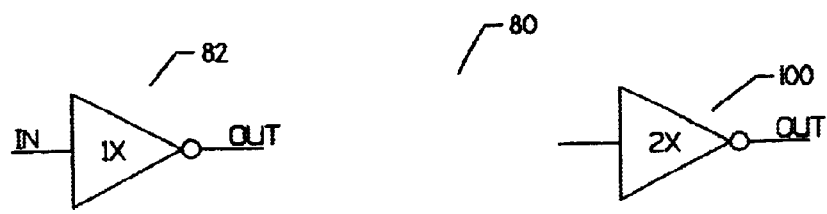
SYMBOL REPRESENTATION
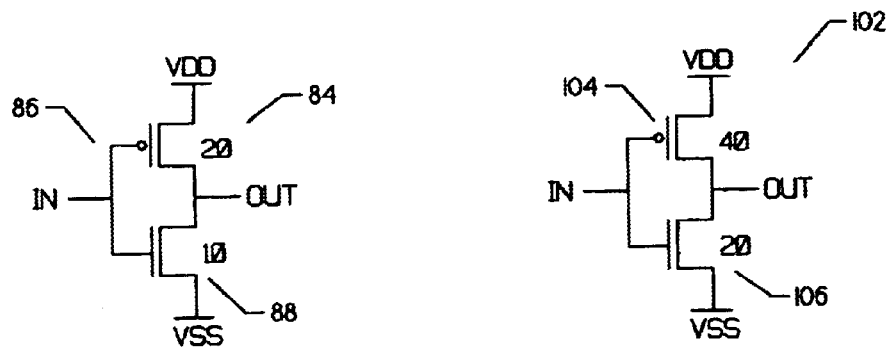
SCHEMATIC REPRESENTATION
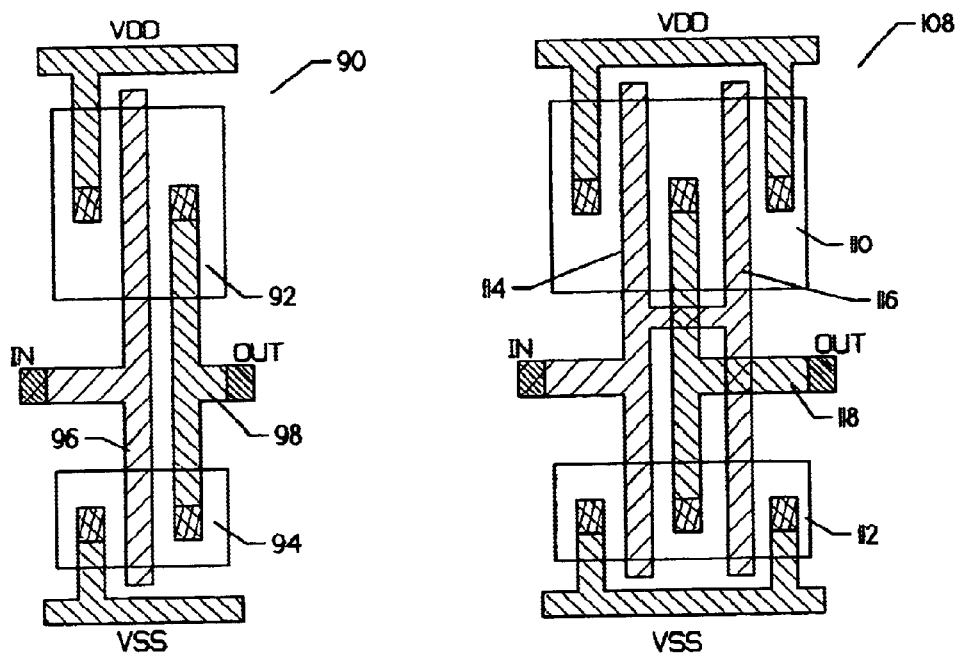
PHYSICAL REPRESENTATION
(LAYOUT)
FIG. 2

METHOD AND APPARATUS FOR USING A PLACEMENT TOOL TO MANIPULATE CELL SUBSTITUTION LISTS

CROSS REFERENCE TO CO-PENDING APPLICATIONS

The present application is related to U.S. patent application Ser. No. 08/789,025, filed Jan. 27, 1997, entitled "Method and Apparatus for Efficiently Viewing a Number of Selected Components Using a Database Editor Tool", U.S. patent application Ser. No. 08/789,026, filed Jan. 27, 1997, entitled "Method and Apparatus for Selecting Components Within a Circuit Design Database", U.S. patent application Ser. No. 08/789,024, filed Jan. 27, 1997, entitled "Method and Apparatus for Identifying Physical Errors in a Placement Database", U.S. patent application Ser. No. 08/789,028, filed a Jan. 27, 1997, entitled "Method and Apparatus for Selectively Viewing Nets Within a Database Editor Tool", U.S. patent application Ser. No. 08/789,703 filed Jan. 27, 1997, entitled "Method and Apparatus for Associating Selected Circuit Instances and for Performing a Group Operation Thereon", U.S. patent application Ser. No. 08/598,506, filed Feb. 7, 1996 entitled "Method and Apparatus for Performing Drive Strength Adjust Optimization in a Circuit Design", U.S. patent application Ser. No. 08/597,931, filed Feb. 7, 1996 entitled "Method and Apparatus for Resolving Conflicts Between Cell Substitution Recommendations Provided by a Drive Strength Adjust Tool", and U.S. patent application Ser. No. 08/597,847, filed Feb. 7, 1996 entitled "Method and Apparatus for Performing Timing Analysis on a Circuit Design", all of which are assigned to the assignee of the present invention and all of which are incorporated herein by reference.

BACKGROUND OF THE INVENTION

1. Field of the Invention—The present invention generally relates to the optimization of circuit designs and more particularly relates to a method and apparatus for using a placement tool to manipulate cell substitution lists.

2. Description of the Prior Art—Integrated circuit, printed circuit board and other related technologies are advancing at a very rapid rate. The latest generation of integrated circuits can incorporate over four times the circuitry than was possible just a few years ago. Further, circuit board and multi-chip module technology has allowed much denser circuit board designs. These and other advancements have allowed the development of increasingly complex and high speed computer systems.

The design of such computer systems has become increasingly difficult and time consuming. To maximize performance and minimize the size and power of such computer system, designers often implement much of the hardware in a number of integrated circuits. For maximum performance, the integrated circuits are often custom or semi-custom designed. Each integrated circuit may contain several hundred thousand gates, and each gate must be placed and routed in accordance with an overall computer system specification, all on a die typically measuring less than 625 mils on a side.

The overall system specification typically defines the overall function of the computer system, including the power and timing requirements thereof. Because of the size and complexity of such computer systems, system designers often partition the overall design into a number of blocks, wherein each of the blocks performs a dedicated function. Partitioning is typically continued until the size of each of the sub-blocks is of a manageable size. A specification for each of the sub-blocks is then written to define the function, timing and power requirements thereof. Often, one or more of the sub-blocks are implemented in an integrated circuit.

After the sub-block specifications have been defined, logic designers typically enter a schematic into a design database for each sub-block, using selected components from a component library. The schematic is typically entered via a schematic entry tool running on an engineering workstation, and the design database is typically stored therein.

The component library may include a number of cells wherein each of the cells implements a different function. For example, the component library may include NAND gates, NOR gates, XOR gates, registers, latches, I/O cells, etc. Further, each of the individual cells may have a logically equivalent component with a different drive strength. The desirability of having different drive strength cells within the component library is discussed in more detail below.

In addition to the above, each of the cells typically have a number of "representations" stored in the component library. For example, a cell may have a "symbolic representation", a "schematic representation", and a "physical representation". When entering the schematic, the designer typically provides the "symbolic representation" directly on the schematic sheet via a schematic editor, and interconnects the symbols to achieve the desired function.

After the schematic has been entered into the design database, the schematic may be processed, or expanded, into a design netlist. The design netlist typically identifies each of the library cells that are used in the schematic, and further identifies the interconnections therebetween. The netlist is often written in an EDIF (Electronic Design Interface) format. EDIF is an industry wide standard, developed to allow the design netlist to be compatible with various software programs developed by different vendors.

An alternative approach for entering the design into a design database involves using sophisticated synthesis tools. The word "tool" as used herein refers to a software program running on a data processing system or an application specific data processing system. In such an approach, the designer enters logical equations describing the behavior (i.e. function) of the circuit design. A first synthesis tool implements the logical equations using logical cells from the component library. A second synthesis tool may then minimize the logic using known techniques, and may attempt to optimize the design based on a number of predetermined factors. For example, the designer may direct the synthesis tool to optimize the design for speed, power, or some other factor.

Typically, the resulting design netlist is provided to a place and route tool. There are a number of place and route tools available op the market today. The place and route tool may read the "physical representation" of each cell within the design and place the physical representation within an imaginary two dimensional box. For integrated circuit designs, the imaginary box often corresponds to the physical boundary of the resulting integrated circuit die.

Once all of the cells have been placed, the place and route tool interconnects the cells in accordance with the design netlist. Depending on the technology and the power bussing strategy of the component library, the place and route tool may provide the required interconnections (or routes) using up to five layers of metal.

Initially, the place and route tool may not take into account critical timing paths or other design parameters.

However, most modern place and route tools have the capability of biasing the placement and routing of the cells to favor predetermined nets within the design database.

In some cases, it is advantageous to manually place certain critical cells within the design. The manual placement of these cells is typically accomplished via a placement tool (e.g. floor-planning tool). Stand alone floorplanning tools are available. However, many place and route tools have at least a limited floor-planning or placement capability. After selected critical cells are manually placed by the designer, the remaining cells may be placed and the circuit design may be routed as described above.

The output of the place and route tools is typically a netlist in the EDIF format. In most large designs, the place and route netlist is hierarchical in nature. Thus, the place and route netlist typically only identifies the placement coordinates and orientation of each of the cells within the design, and does not contain the actual physical representation of each cell. Rather, the place and route netlist contains pointers to the physical representations stored in the component library. Thus, if a particular cell is used a number of times within the design, only one copy of the physical representation is required to be stored. The place and route netlist typically also identifies the interconnections, or routes, by the coordinates of the starting, ending, and any other points where the route changes direction. Further, the width of the route is also identified.

After the place and route netlist is generated, the designer may use an extraction tool to extract an RC file therefrom. The extraction tool may process the place and route netlist and may determine the resistance, capacitance, or any other parameters selected by the designer, for each net in the design. For example, the extraction tool may determine the capacitance of a particular net by calculating the input load capacitance for each gate connected to the net, and may further determine the capacitance between a corresponding route and, any other layer within the design, including the substrate. That is, the extraction tool may determine what layers the particular route overlaps, and may calculate the capacitance generated therebetween.

To provide accurate results, the extraction tool is often provided with technology specific parameters including oxide thicknesses between metal layers, the permittivity of each of the oxide layers, etc. These technology specific parameters are often stored in a technology file, which may be read by the extraction tool.

After the extraction tool provides an RC file for the design, the RC file and the original netlist may be provided to a timing analysis tool. The timing analysis tool processes the netlist and the RC file to determine the timing of predetermined circuit paths within the design. Part of the pre-processing performed by the timing analysis tool is to read the timing information from the component library for each of the cells used in the design. For example, the timing information stored in the component library may include parameters such as a base delay, and delay per unit of capacitance. The timing analysis tool may use the timing information, along with the RC file to determine the delay for each cell within the design. Thereafter, the timing analysis tool identifies predetermined timing paths within the design, and adds the delay for each of the cells to determine an overall path delay for each timing path. The timing analysis tool may then report all timing paths that have an overall path delay that falls outside of a predetermined timing specification.

An approach to aid the designer in evaluating and correcting the timing violations identified by the timing analysis tool is suggested in an article entitled "CML III Bipolar Standard Cell Library", by Brian N. Tufte (Proceedings of the 1988 Bipolar Circuits Conference, Minneapolis, Minn., 1988). Tufte suggests using a software tool called SPEN (Speed Power Enhancement Program) to identify cells within the design that could be replaced by a higher power cell to reduce the delay of the corresponding timing path.

After cells have been identified for substitution, the designer may make the desired changes to the original design database. This may be accomplished by manually manipulating the design database using a database editor tool, or by manually creating a script to direct the database editor to make such changes. Alternatively, and depending on the how the database was originally entered, the designer may manually edit the original behavioral equations by substituting the selected higher power cells therein.

In either case, the design database is again expanded or synthesized to provide an updated design netlist incorporating the substituted cells, which may be provided to the place and route tool. The updated design may then be placed and routed. The, process of placing and routing the design, extracting an RC file, performing timing analysis, identifying cells for substitution, and updating the design database may be repeated until the design falls within the timing specification.

A limitation of the above design approach is that each iteration may take an unacceptable amount of time to complete. A substantial portion of the above referenced design cycle may be consumed by the expansion or synthesis of the design database, and by the placing and routing the design netlist. It would thus be advantageous to eliminate these steps from subsequent design iterations.

SUMMARY OF THE INVENTION

The present invention overcomes many of the disadvantages of the prior art by providing a floorplanning tool that may import and export cell substitution and/or cell selection lists. The cell substitution and/or cell selection lists may be used by the floorplanning tool to substitute and/or modify the placement design database, rather than the original schematic or behavioral database. This may eliminate the need to re-synthesize and re-place and route the circuit design during each design iteration. The present invention further contemplates providing a reset feature which may reset the circuit design database to a previous state, if desired.

The present invention recognizes that the placement and routing of a typical circuit design may not significantly change when only selected cell substitutions and/or minor placement changes are made therein. Thus, it is recognized that it may not be necessary to repeat the synthesis step and/or the place and route step during each design iteration, as taught by the prior art. Rather, it is contemplated that selected design changes may be made in the placement design database. The design verification steps may then be performed on the modified placement design database, thereby eliminating the need to re-synthesize and re-place and route the circuit design during each design iteration.

The import feature of the present invention may be used to read a selected cell substitution list into a placement tool. The cell substitution list may identify selected cells that may be substituted with logically equivalent cells to overcome pre-identified timing and/or physical violations. In a preferred embodiment, the cell substitution lists may be generated in accordance with U.S. patent application Ser. No. 08/598,506, filed Feb. 7, 1996 entitled "Method and Apparatus for Performing Drive Strength Adjust Optimization in a Circuit Design", U.S. patent application Ser. No. 08/597,931, filed Feb. 7, 1996 entitled "Method and Apparatus for Resolving Conflicts Between Cell Substitution Recommendations Provided by a Drive Strength Adjust Tool", and U.S. patent application Ser. No. 08/597,847, filed Feb. 7, 1996 entitled "Method and Apparatus for Performing Timing Analysis on a Circuit Design". The floorplanning tool may then substitute the selected cells identified in the cell substitution list, if desired.

The import feature may also allow a circuit designer to easily identify and correct cell placements that cause pre-identified physical violations. A cell selection list may identify selected cells that are involved in detected physical violations. In a preferred embodiment, the placement tool may import the cell selection list to identify and correct the cell placements that caused the physical violations. This is further described in U.S. patent application Ser. No. 08/789,025, filed Jan. 27, 1997, entitled "Method and Apparatus for Efficiently Viewing a Number of Selected Components Using a Database Editor Tool", U.S. patent application Ser. No. 08/789,026, filed Jan. 27, 1997, entitled "Method and Apparatus for Selecting Components Within a Circuit Design Database", and U.S. patent application Ser. No. 08/789,024, filed Jan. 27, 1997, entitled "Method and Apparatus for Identifying Physical Errors in a Placement Database".

The export feature of the present invention may allow the placement tool to write selected cell substitution and/or cell selection lists to a file. This may be useful if later design iterations result in changes that must be discarded, or may provide a base from which future changes can be judged. The export feature may also be used to write the entire placement design database to a file.

Finally, the present invention contemplates providing a reset feature, which may reset a circuit design database to a previous state. This may be accomplished by using a number of the previously stored cell substitution and/or cell selection lists. The resetting feature may be particularly useful when a selected previous design iteration is found to provide the best design results. The importing feature may be used to import each of the cell substitution lists for each of the design iterations subsequent to the selected iteration. Then, the resetting feature may reset the circuit design to a state that corresponds to the selected previous design iteration by simply reversing the cell substitutions indicated therein. Likewise, the resetting feature may be used to discard all cell substitutions, and return the circuit design to an original or default state.

As indicated above, the exporting feature may write the entire placement design database to a file. This may be done for each design iteration. Thus, it is contemplated that the resetting feature may reset the circuit design database to a previous state by simply reading the appropriate previous placement design database that corresponds to the desired design iteration.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 2 is a block diagram showing typical cell representations for two logically equivalent cells having different drive strengths;

DETAILED DESCRIPTION OF THE PREFERRED EMBODIMENTS

Figure 1:
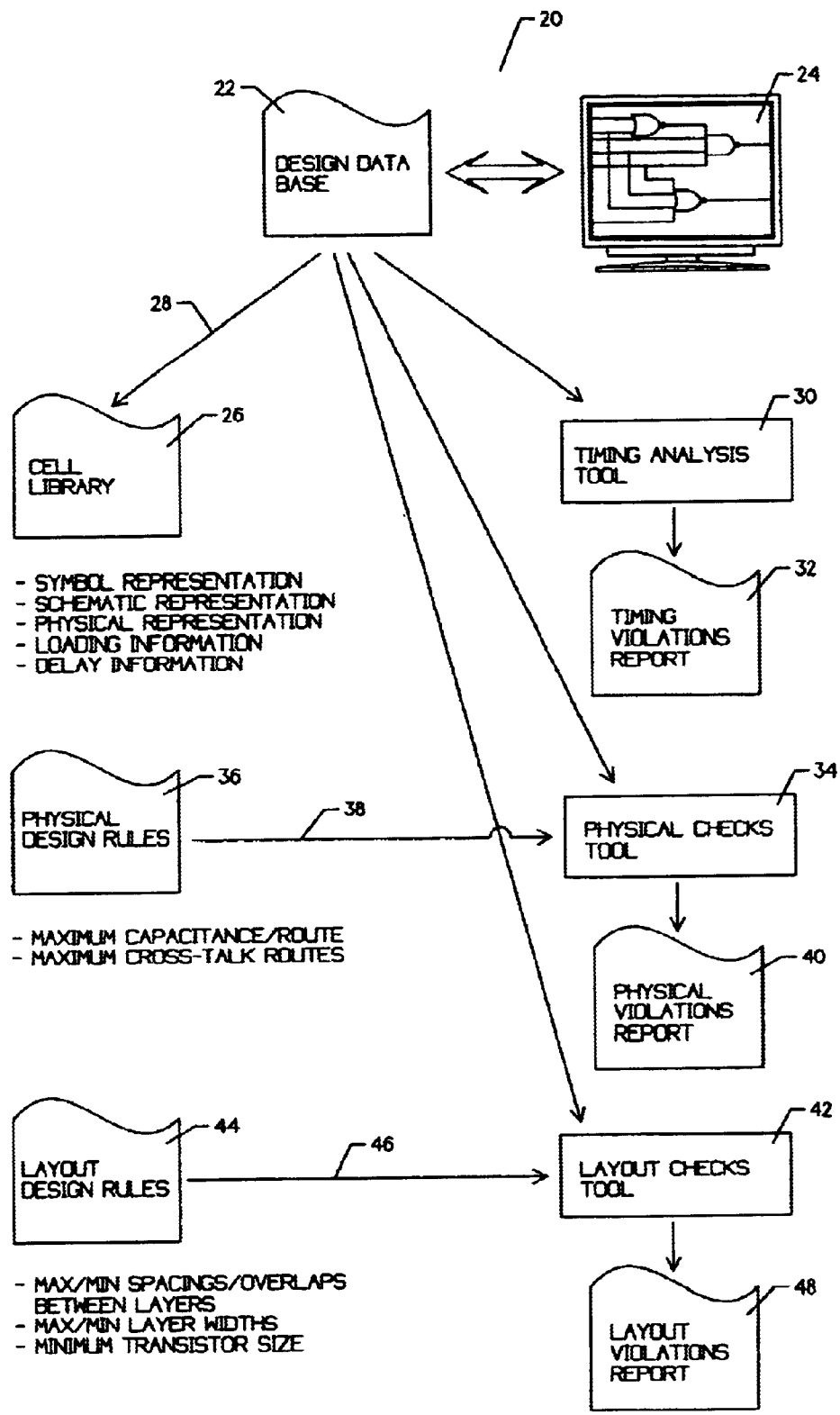
FIG. 1 is a block diagram showing a design database, a cell library and various software tools used to verify the design database.

FIG. 1 is a block diagram showing a design database, a component library and various software tools used to verify that the design database meets predefined specifications. The diagram is generally shown at 20. A typical design data base is shown at 22.

Initially, a functional description of the desired circuit is input into the design database 22. This may be accomplished in a number of ways, but typically logic designers enter a schematic using selected components from a component library 26. The schematic is typically entered via a schematic editor tool on an engineering workstation as shown at 24.

The component library 26 may include a number of cells wherein each of the cells implements a different function. For example, the component library may include NAND gates, NOR gates, XOR gates, registers, latches, I/O cells, etc. Further, each of the individual cells may have a logically equivalent component with a different drive strength (see FIG. 2). The desirability of having different drive strength cells within the component library is discussed in more detail below.

In addition to the above, each of the cells typically have a number of "representations" stored in the component library 26. For example, a cell may have a "symbolic representation", a "schematic representation", and a "physical representation". When entering the schematic, the designer typically provide the "symbolic representation" directly on the schematic sheet via the schematic editor tool as shown at 24, and interconnects the symbols to achieve the desired function.

After the schematic has been entered into the design database 22, the schematic may be processed, or expanded, into a design netlist. The design netlist typically identifies each of the library cells that are used in the schematic, and further identifies the interconnections therebetween. The netlist is often written in an EDIF (Electronic Design Interface) format. EDIF is an industry wide standard, developed to allow the design netlist to be compatible with various software programs developed by different vendors.

An alternative approach to entering the design into the design database 22 involves using sophisticated synthesis tools (not shown). In such an approach, the designer enters logical equations describing the behavior (i.e., function) of the design. A first synthesis tool implements the logical equations using logical cells from the component library 26. A second synthesis tool may then minimize the logic using known techniques, and may attempt to optimize the design based on a number of predetermined factors. For example, the designer may direct the synthesis tool to optimize the design for speed, power, or some other factor.

Typically, the resulting design netlist is provided to a place and route tool (not shown). There are a number of place and route tools available on the market today. The place and route tool may read the "physical representation" of each cell within the design and place the physical representation within an imaginary two dimensional box. For integrated circuit designs, the imaginary box often corresponds to the outer periphery of the resulting integrated circuit die. Once all of the cells have been placed, the place and route tool interconnects the cells in accordance with the design netlist. Depending on the technology and the power bussing strategy of the component library, the place and route tool may provide the required interconnections (or routes) using up to five layers of metal.

The output of the place and route tool is stored in the design database 22. In most large designs, the place and route netlist may be hierarchical in nature. Thus, the place and route netlist typically only identifies the placement coordinates and orientation of each of the cells within the design, and does not contain the actual physical representation of each cell. Rather, the place and route netlist contains pointers 28 to the physical representations stored in the component library 26. Thus, if a particular cell is used a number of times within the design, only one copy of the physical representation is required to be stored. The place and route netlist typically also identifies the interconnections, or routes, by the coordinates of the starting, ending, and any other points where the route changes direction. Further, the width of the route is also identified.

After the place and route netlist is generated, the designer may use an extraction tool (not shown) to extract an RC file therefrom. The extraction tool may process the place and route netlist and may determine the resistance, capacitance, or any other parameters selected by the designer, for each net in the design. For example, the extraction tool may determine the capacitance of a particular net by calculating the input load capacitance for each gate connected to the net, and may further determine the capacitance between a corresponding route and any other layer within the design, including the substrate. That is, the extraction tool may determine what layers the particular route overlaps, and may calculate the capacitance generated therebetween.

To provide accurate results, the extraction tool is often provided with technology specific parameters including oxide thicknesses between metal layers, the permittivity of each of the oxide layers, etc. These technology specific parameters are often stored in a technology file (not shown), which may be read by the extraction tool.

After the extraction tool provides an RC file for the design, the RC file and the original netlist may be provided to a timing analysis tool 30. The timing analysis tool 30 processes the netlist and the RC file to determine the timing of predetermined circuit paths within the design. Part of the pre-processing performed by the timing analysis tool 30 is to read the timing information from the component library 26 for each of the cells used in the design. For example, the timing information stored in the component library 26 may include parameters such as a base delay, and delay per unit of capacitance. The timing analysis tool 30 may use the timing information, along with the RC file to determine the delay for each cell within the design. Thereafter, the timing analysis tool 30 may identify predetermined timing paths within the design, and add the delay for each of the cells to determine an overall path delay for each timing path. The timing analysis tool 30 may then report all timing paths that have an overall path delay that falls outside of a predetermined timing specification, as shown at 32. The timing analysis tool 30 may also determine if setup and hold times are met.

If no timing violations exist, the design is deemed to meet the predefined timing specification. If, however, the timing analysis tool 30 identifies timing violations, the designer must evaluate each timing violation, and provide corrections to the design database 22 to overcome such timing violations.

The design database 22 may also be provided to a load per net physical checks tool 34. The physical checks tool 34 may read predefined physical design rules 36. The physical design rules may include parameters such as maximum net, maximum cross-talk between nets, etc. The physical checks tool 34 may perform these physical checks on the design database 22, and may report any violations as shown at 40.

Finally, the design database 22 may be provided to a layout checks tool 42. The layout checks tool 42 may read predefined layout design rules. The layout design rules 44 may include parameters such as maximum and minimum spacings and overlaps between layers, maximum and minimum layer widths, etc. The layout design rules are dictated by the particular processing technology used, and may help ensure that the resulting design can be manufactured with acceptable yields. The layout checks tool 42 may report any violations as shown at 48.

FIG. 2 is a block diagram showing typical cell representations for two logically equivalent cells having different drive strengths. The diagram is generally shown at 80. As indicated above, each of the cells in a component library 26 typically have a number of "representations" stored therein. For example, a cell may have a "symbolic representation", a "schematic representation", and a "physical representation". The symbolic representation is often used for schematic entry. The schematic representation is often used by circuit simulation programs such as SPICE, and a number of others tools. The physical representation is used by the extraction tool, the place and route tool, the physical checks tool 34, the layout checks tool, and a number of other tools.

Each of the individual cells may also have a logically equivalent component with a different drive strength. The desirability of having different drive strength cells within the component library is discussed in more detail below. FIG. 2 shows exemplary representations for a "1X" inverter and a "2X" inverter, wherein the "1X" and "2X" designations indicate the drive strength of the corresponding cell. For example, the "2X" inverter has twice the drive strength as the "1X" inverter.

The symbolic representation for the "1X" inverter is shown at 82, and the schematic representation for the "1X" inverter is shown at 84. The schematic representation 84 shows a P-Channel device 86 with a width of 20 and an N-Channel device 88 with a width of 10.

The physical representation of the "1X" inverter is generally shown at 90 and includes a number of mask layers that are used during the manufacturing of the component. For example, an N-Tub is shown at 92 and a P-Tub is shown at 94. The P-Channel transistor is created by a poly-silicon gate 96 overlapping the N-Tub 92 as shown. Similarly, the N-Channel transistor is created by the poly-silicon gate 96 overlapping the P-Tub 94 as shown.

The symbolic representation for the "2X" inverter is shown at 100, and the schematic representation for the "2X" inverter is shown at 102. The schematic representation 102 shows a P-Channel device 104 with a width of 40 and an N-Channel device 106 with a width of 20. Note that these widths are twice that of the "1X" inverter 84.

The physical representation of the "2X" inverter is generally shown at 108 and includes a number of mask layers that are used during the manufacturing of the component. For example, an N-Tub is shown at 110 and a P-Tub is shown at 112. The P-Channel device is created by poly-silicon gates 114 and 116 overlapping the N-Tub 110 as shown. Similarly, the N-Channel transistor is created by the polysilicon gates 114 and 116 overlapping the P-Tub 112 as shown. That is, the P-channel transistor 104 essentially includes two P-channel transistors connected in parallel, each having a width of 20. Similarly, the N-channel transistor 106 essentially includes two N-channel transistors in parallel, each having a width of 10.

Figure 3:
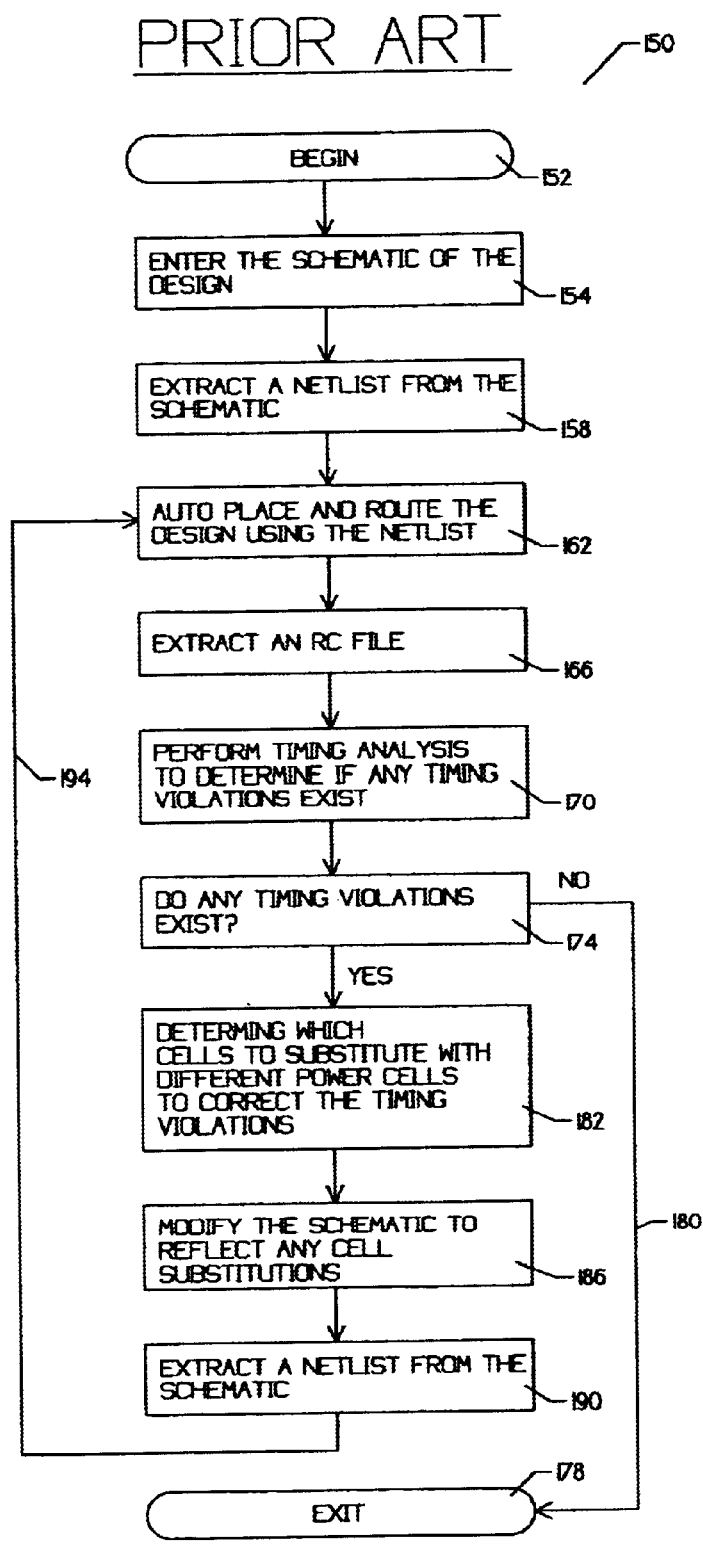
FIG. 3 is a flow diagram showing a prior art design method.

FIG. 3 is a flow diagram showing a prior art design method. The diagram is generally shown at 150. The method is entered at element 152. A logic designer enters a schematic into a design database as shown at 154, using selected-components from a component library. The schematic is typically entered via a schematic editor tool running on an engineering workstation, and the design database is typically stored therein.

After the schematic has been entered into the design database, the schematic may be processed, or expanded, into a design netlist as shown at 158. The design netlist typically identifies each of the library cells that are used in the schematic, and further identifies the interconnections therebetween. The netlist is often written in an EDIF (Electronic Design Interface) format. EDIF is an industry wide standard, developed to allow the design netlist to be compatible with various software tools developed by different vendors.

The resulting design netlist may then be provided to a place and route tool as shown at 162. There are a number of place and route tools available on the market today. The place and route tool may read the "physical representation" of each cell within the design and place the physical representation within an imaginary two dimensional box. For integrated circuit designs, the imaginary box often corresponds to the physical boundary of the resulting integrated circuit die. Once all of the cells have been placed, the place and route tool interconnects the cells in accordance with the design netlist. Depending on the technology and the power bussing strategy of the component library, the place and route tool may provide the required interconnections (or routes) using up to five layers of metal.

In most large designs, the place and route netlist is hierarchical in nature. Thus, the place and route netlist typically only identifies the placement coordinates and orientation of each of the cells within the design, and does not contain the actual physical representation of each cell. Rather, the place and route netlist contains pointers to the physical representations stored in the component library.

After the place and route netlist is generated, the designer may use an extraction tool to extract an RC file therefrom as shown at 166. The extraction tool may process the place and route netlist and may determine the resistance, capacitance, or any other parameters selected by the designer, for each net in the design. For example, the extraction tool may determine the capacitance of a particular net by calculating the input load capacitance for each gate connected to the net, and may further determine the capacitance between a corresponding route and any other layer within the design, including the substrate. That is, the extraction tool may determine what layers the particular route overlaps, and may calculate the capacitance generated therebetween.

To provide accurate results, the extraction tool is often provided with technology specific parameters including oxide thicknesses between metal layers, the permittivity of each of the oxide layers, etc. These technology specific parameters are often stored in a technology file, which may be read by the extraction tool.

After the extraction tool provides an RC file for the design, the RC file and the original design netlist may be provided to a timing analysis tool as shown at 170. The timing analysis tool processes the design netlist and the RC file to determine the timing of predetermined circuit paths within the design. Part of the pre-processing performed by the timing analysis tool is to read the timing information from the component library for each of the cells used in the design. For example, the timing information stored in the component library may include parameters such as a base delay, and delay per unit of capacitance. The timing analysis tool may use the timing information, along with the RC file to determine the delay for each cell within the design. Thereafter, the timing analysis tool identifies predetermined timing paths within the design, and adds the delay for each of the cells to determine an overall path delay for each timing path. The timing analysis tool may then report all timing paths that have an overall path delay that falls outside of a predetermined timing specification. That is, the timing analysis tool may determine if any timing violations exist.

If no timing violations exist, the design is deemed to meet the predefined timing specification and the method is exited as shown at 178 via interface 180. If however, the timing analysis tool identifies timing violations, the designer must evaluate each timing violation, and provide corrections to the design to overcome such timing violations.

An approach to aid the designer in evaluating and correcting the timing violations identified by the timing analysis tool is suggested in an article entitled "CML III Bipolar Standard Cell Library", by Brian N. Tufte (Proceedings of the 1988 Bipolar Circuits Conference, Minneapolis, Minn., 1988). Tufte suggests using a software tool called SPEN (Speed Power Enhancement Program) to identify cells within the design that could be replaced by a higher power cell to reduce the delay of the corresponding timing path.

After cells have been identified for substitution as shown at 182, the designer may make the desired changes to the original design database as shown at 186. This may be accomplished by manually manipulating the design database using a schematic editor tool, or by manually creating a script to direct the schematic editor tool to make such changes. It should be noted that this manual modification may be lengthy since a large number of modifications may exist. In addition, the manual modifications may have to be redone if the design is modified due to a different design error.

The design database is then expanded to provide an updated EDIF netlist incorporating the substituted cells as shown at 190, which may be provided to the place and route tool via interface 194. The updated design may again be placed and routed as shown at 162. The process of place and routing the design, extracting an RC file, performing timing analysis, identifying cells for substitution, updating the design database, and expanding the design database to provide an updated netlist may be repeated until the design falls within the design specification.

A limitation of the above referenced design process is that each iteration may take an unacceptable amount of time to complete. A substantial portion of the above referenced design cycle may be consumed by the expansion (or synthesis) of the design database, and the placing and routing the design. It would thus be advantageous to eliminate these steps from subsequent design iterations.

Figure 4:
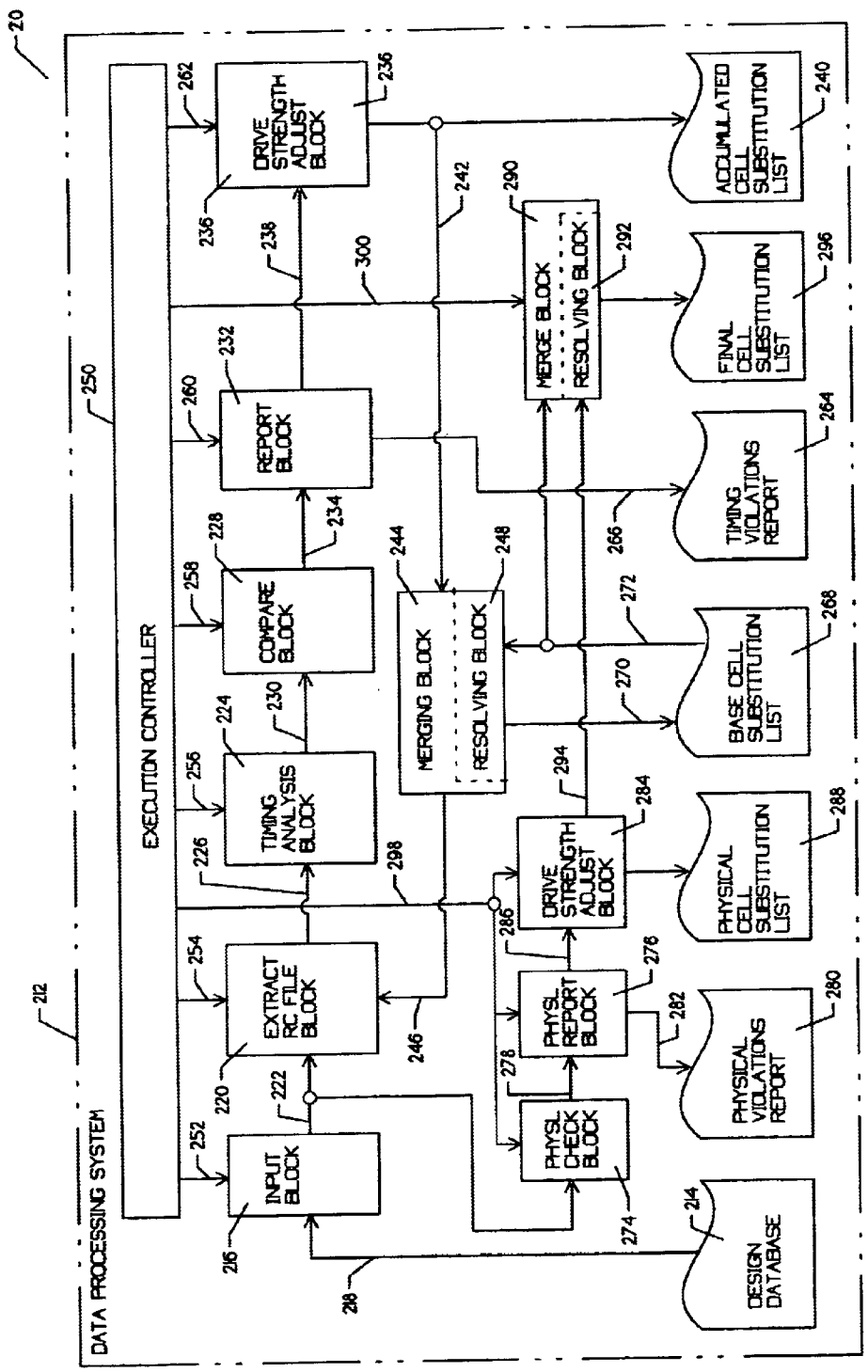
FIG. 4 is a block diagram showing a data processing system for providing cell substitution lists.

FIG. 4 is a block diagram showing a data processing system for providing cell substitution lists. The diagram is generally shown at 210, which includes a data processing system 212. The data processing system 212 includes a memory for storing a number of files, including design database 214. Further, the data processing system 212 includes an execution controller 250 for controlling the operation of data processing system 212.

A design database 214 is provided to a memory (not shown) located either internally or externally to data processing system 212. The memory may be a hard disk, RAM, ROM, magnetic tape or any other storage medium. It is contemplated that the design database 214 may include place and route data as described above.

The design database 214 may be provided to input block 216 via interface 218. Input block 216 receives the design database 214 and provides the design database 214 to extract RC file block 220 via interface 222. Extract RC file block 220 extracts an RC file from the design database 214 as described above. Both the design database 214 and the RC file are provided to timing analysis block 224 via interface 226.

Timing Analysis block 224 analyzes a number of timing paths within the circuit design database 214. In the exemplary embodiment, the timing analysis block 224 calculates the delay of selected components along each of the timing paths and sums the delays of the selected components. To determine if any of the timing paths fall outside of a predefined specification, the exemplary embodiment may include a compare block 228 coupled to the timing analysis block 224 via interface 230, for comparing the delay along a selected timing path with a predefined specification.

The compare block 228 may provide the result of the compare to a report block 232 via interface 234. Report block 232 may write all timing violations to a timing violations file as shown at 264. Further, report block 232 may report all timing violations to a drive strength adjust block 236 via interface 238.

To mitigate any timing violations that may exist, the drive strength adjust block 236 may determine a number of selected components along the timing paths identified by the report block 232 for substitution with a corresponding logically equivalent component having a different drive strength. The drive strength adjust block 236 may either increase or decrease the drive strength of selected cells, depending on the overall effect of the substitution on the performance of the timing path.

As indicated above, it is contemplated that the drive strength adjust block 236 may determine which of the cells within the design to substitute for a logically equivalent component having a different drive strength. In a preferred embodiment, this may be accomplished by identifying a number of timing paths wherein each of the timing paths include a source latch, a destination latch, and a number of components connected therebetween. The drive strength adjust block 236 may identify the number of components that are in each of the number of timing paths, and the order thereof.

The drive strength adjust block 236 may then substitute a first one of the number of components with a corresponding logically equivalent component with a different drive strength, and may determine the delay of the timing path. Then, the drive strength adjust block 236 may substitute the first one of the number of components with a corresponding logically equivalent component having yet another drive strength, and may determine the delay of the timing path. The drive strength adjust block 236 may then determine which cell substitution provided the optimum delay. This process may be repeated until all logically equivalent components having different drive strengths are substituted for the first one of the number of components. The drive strength adjust block 236 may then select the logically equivalent component that produces the optimum delay for the timing path.

This process may be continued for each of the components along the corresponding timing path, thereby resulting in an overall optimum delay for the corresponding timing path. The drive strength adjust block 236 may output a list of the selected components and the suggested drive strength therefor.

It is contemplated that the cells to be substituted may be recorded in an accumulated cell substitution list 240 via interface 242 during each of the number of iteration. The accumulated cell substitution list 240 may then be merged with a base cell substitution list 268 by merging block 244. The accumulated cell substitution list 240 may be provided to the merging block 244 via interface 242, and the base cell substitution list 268 may be provided to the merging block 244 via interface 272. The merging block 244 may provide an updated base cell substitution list 268 via interface 270. The updated base cell substitution list 268 may be provided to the extract RC file block 220 via interface 246, wherein an updated RC file may be generated and provided to the timing analysis block 224 for the next design iteration.

Execution controller 250 may control input block 216, extract RC file block 220, timing analysis block 224, compare block 228, report block 232, and drive strength adjust block 236 via interfaces 252, 254, 256, 258, 260, and 262, respectively. Execution controller 250 controls the flow of the design database through the data processing system 212 such that the design database is processed by the extracting RC file block 220, timing analysis block 224, comparing block 228, report block 232, drive strength adjust block 236, and the merging block 244 for a predetermined number of iterations, or until the design meets the predefined specification.

It is contemplated that the merging block 244 may include a resolving block 248 for resolving any conflict between the accumulated cell substitution list 240 and the base cell substitution list 268. An example of when a conflict may arise is when a particular cell is identified in more than one timing path (see FIG. 5) during different design iterations. That is, the base cell substitution list 268 may identify a particular cell within a first timing path and may indicate that the particular cell is to be substituted with a logically equivalent cell having a first drive strength. The accumulated cell substitution list 240, and during the current design iteration, may also identify the same cell within a second timing path and may indicate that the particular cell is to be substituted with a logically equivalent cell having a second drive strength. It is contemplated that the resolving block 248 may resolve this and other conflicts. In a preferred embodiment, the conflict is resolved based upon a predetermined priority scheme. Further details of the preferred priority scheme may be found in the above referenced U.S. patent application Ser. No. RA-3429, which is incorporated herein by reference.

In addition to the above, it is contemplated that the exemplary embodiment may perform physical checks of the circuit design and indicate any physical check violations therein. A physical checks block 274 may receive the design database 214 from the input block 216 via interface 222. The physical checks block 274 may process the design database 214 and determine if any physical checks violations are present. The physical checks block 274 may provide any physical checks violations to physical report block 276 via interface 278. Typical physical checks violations may include, for example, a capacitance on a route that exceeds a maximum capacitance value, cross-talk between two routes exceeds a maximum cross-talk value, etc. Physical report block 276 may write a physical violations report 280 to memory via interface 282. Further, physical report block 276 may report the physical violations to a second drive strength adjust block 284.

To mitigate any physical check violations, the second drive strength adjust block 284 may select cells to be substituted with corresponding logically equivalent components having a different drive strength. It is contemplated that the cells selected by the second drive strength adjust block 284 may be recorded in a physical cell substitution list 288. Physical checks block 274, physical report block 276, and the second drive strength adjust block 284 may be controlled by execution controller 250 via interface 298.

After the execution controller 250 executes the extracting RC file block 220, timing analysis block 224, comparing block 228, report block 232, drive strength adjust block 236, and the merging block 244 for a predetermined number of iterations, a second merging block 290 may merge the final base cell substitution list 268 with the physical cell substitution list 288. It is contemplated that the second merging block 290 may include a resolving block 292 to resolve any conflict between the final base cell substitution list 268 and the physical cell substitution list 288. Merging block 290 may be controlled by execution controller 250 via interface 300.

An example of when a conflict may arise in the second merging block 290 is when a particular cell is identified both by the drive strength adjust block 284 and the drive strength adjust block 236. That is, the final base cell substitution list 268 may indicate that a particular cell is to be substituted with a logically equivalent cell having a first drive strength to correct a timing violation. The drive strength adjust block 284 may also identify the same cell and may indicate that the particular cell is to be substituted with a logically equivalent cell having a second drive strength to correct a physical checks violation. It is contemplated that the resolving block 292 may resolve these and other conflicts. In a preferred embodiment, the conflict is resolved using a predetermined priority scheme. Further details of the preferred priority scheme may be found in the above referenced U.S. patent application Ser. No. RA-3429, which is incorporated herein by reference.

After all conflicts are resolved, the second merging block 290 may provide a final cell substitution list 296. In a preferred embodiment, the final cell substitution list 296 is provided to a manual placement tool, or floor-planning tool (not shown). In accordance with the present invention, the floorplanning tool may have an interface for reading the final substitution list and make the substitutions indicated therein to the design database.

The output of the floorplanning tool may then be provided to the place and route tool for final placement and routing. It is recommended that the resulting design database be run through the timing analysis tool and the physical checks tool to verify that the final design meets the predetermined specification.

Finally, it is contemplated that the drive strength adjust blocks 236 and 284 may be used to reduce the power consumption of a circuit design. For example, the drive strength adjust block 236 may identify particular timing paths within the design that have excess margin with respect to the timing specification. Under such circumstances, the drive strength adjust block 236 may substitute selected components along these timing paths with a corresponding logically equivalent component having a lower drive strength to reduce the power consumption of the circuit design.

Figure 5:
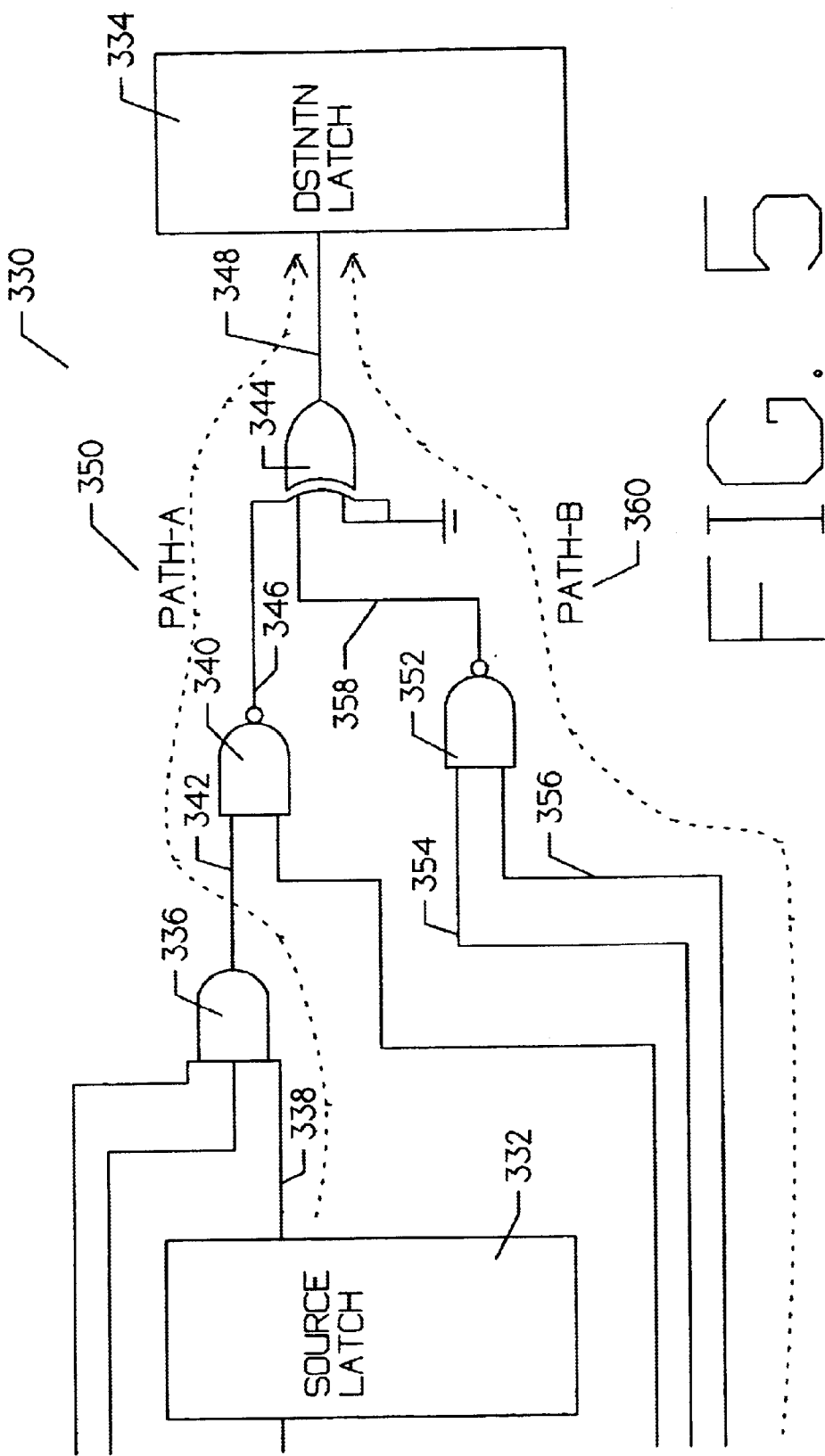
FIG. 5 is a schematic diagram showing two intersecting timing paths within a circuit design.

FIG. 5 is a schematic diagram showing two intersecting timing paths within a circuit design. The diagram is generally shown at 330. As indicated above, it is contemplated that the drive strength adjust block 236 (see FIG. 4) may determine which of the cells within the design to substitute for a logically equivalent component having a different drive strength. In a preferred embodiment, this may be accomplished by identifying a number of timing paths wherein each of the timing paths include a source latch 332, a destination latch 334, and a number of components connected therebetween. In the illustrative circuit design, path-A 350 and path-B 360 are shown. Path-A 350 extends from source latch 332 to AND gate 336 via interface 338, from AND gate 336 to NAND gate 340 via interface 342, from NAND gate 340 to XOR gate 344 via interface 346, and finally to destination latch 334 via interface 348. Similarly, Path-B 360 extends from a source latch (not shown) to NAND gate 352 via interface 356, from NAND gate 352 to XOR gate 344 via interface 358, and finally to destination latch 334 via interface 348.

With respect to path-A 350, the drive strength adjust block 236 may substitute a first one of the number of components, for example component 336, with a corresponding logically equivalent component with a different drive strength, and may determine the delay of timing path-A 350. Then, the drive strength adjust block 236 may substituting the first one of the number of components 336 with a corresponding logically equivalent component having yet another drive strength, and may determine the delay of timing path-A 350. The drive strength adjust block 236 may then determine which cell substitution provided the optimum delay. This process may be repeated until all logically equivalent components having different drive strengths are substituted for the first one of the number of components 336. The drive strength adjust block 236 may then select the logically equivalent component that produces the optimum delay for timing path-A 350.

This process may be continued for each of the components along the corresponding timing path including gates 340 and 344, thereby resulting in an overall optimum delay for the corresponding timing path-A 350.

Similarly, and with respect to path-B 360, the drive strength adjust block 236 may substitute a first one of the number of components, for example component 352, with a corresponding logically equivalent component with a different drive strength, and may determine the delay of timing path-B 360. Then, the drive strength adjust block 236 may substitute the first one of the number of components 352 with a corresponding logically equivalent component having yet another drive strength, and may determine the delay of timing path-B 360. The drive strength adjust block 236 may then determine which cell substitution provided the optimum delay. This process may be repeated until all logically equivalent components having different drive strengths are substituted for the first one of the number of components 352. The drive strength adjust block 236 may then select the logically equivalent component that produces the optimum delay for timing path-B 360.

This process may be continued for each of the components along the corresponding timing path including gate 344, thereby resulting in an overall optimum delay for the corresponding timing path-B 360.

In the present example, it is readily apparent that the drive strength adjust block 236 may produce a conflict with respect to XOR gate 344,. That is, drive strength adjust block 236 may conclude that XOR gate 344 should be substituted with a logically equivalent gate having a first drive strength when analyzing timing path-A 350, and may conclude that XOR gate 344 should be substituted with a logically equivalent gate having a second drive strength when analyzing timing path-B 360. Thus, it is contemplated that drive strength adjust block 236 may itself have a resolving block (not shown) for resolving these conflicts. Further details of the preferred priority scheme may be found in the above referenced U.S. patent application Ser. No. RA-3429, which is incorporated herein by reference. After the conflict is resolved, the drive strength adjust block 236 may output a list of the selected components and the suggested drive strength therefor.

Figure 6:
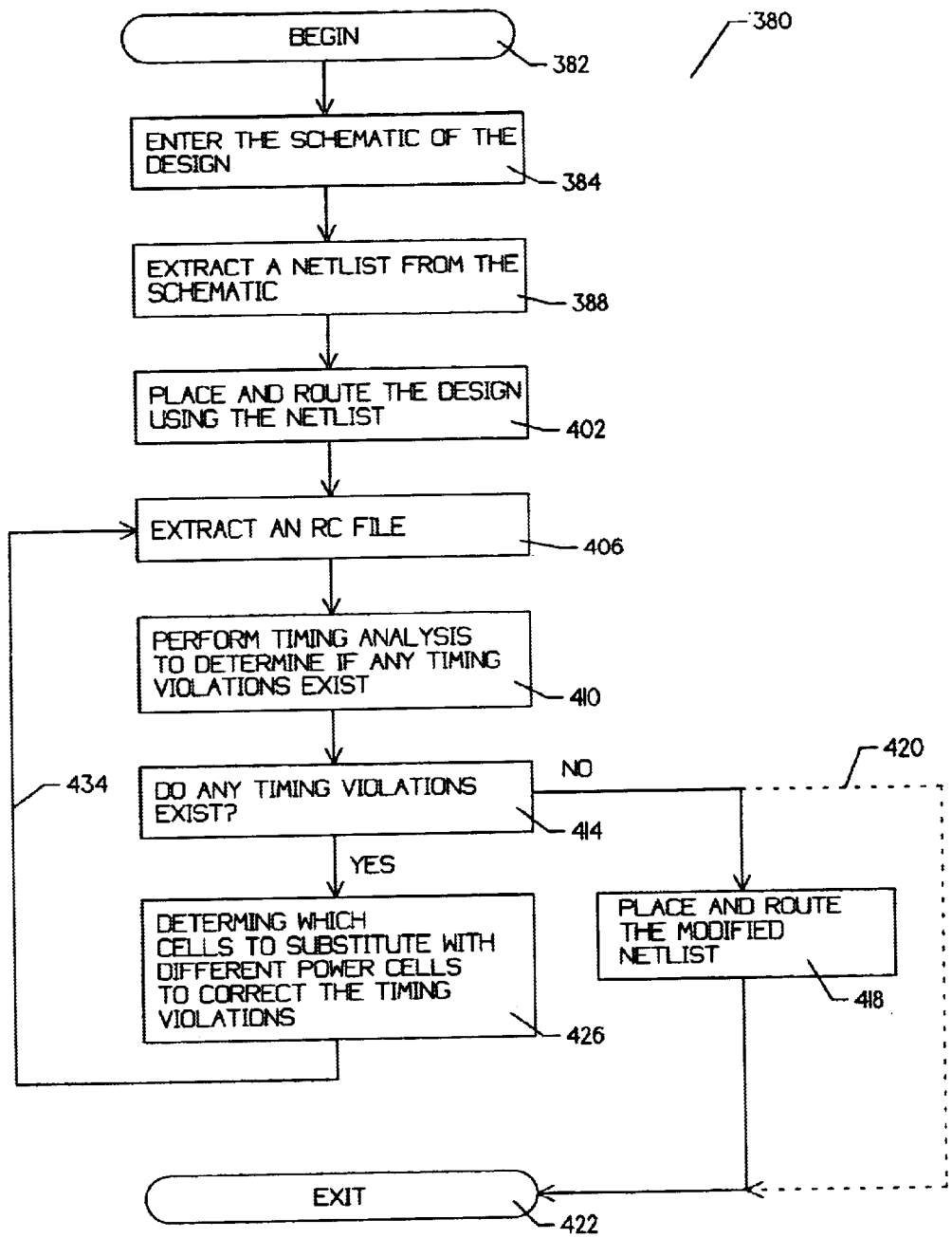
FIG. 6 is a flow diagram showing a first improved design method.

FIG. 6 is a flow diagram showing a first improved design method. The diagram is generally shown at 380. The method is entered at element 382. A logic designer typically enters a schematic into a design database as shown at 384, using selected components from a component library. The schematic is typically entered via a database editor running on an engineering workstation, and the design database is typically stored therein.

After the schematic has been entered into the design database, the schematic may be processed, or expanded, into a design netlist as shown at 388. The design netlist typically identifies each of the library cells that are used in the schematic, and further identifies the interconnections therebetween.

The resulting design netlist may then be provided to a place and route tool as shown at 402. The place and route tool may read the "physical representation" of each cell within the design, and place the physical representation within an imaginary two dimensional box. For integrated circuit designs, the imaginary box often corresponds to the outer periphery of the resulting integrated circuit die. Once all of the cells have been placed, the place and route tool interconnects the cells in accordance with the design netlist. Depending on the technology and the power bussing strategy of the component library, the place and route tool may provide the required interconnections (or routes) using up to five layers of metal.

After the place and route netlist is generated, the designer may use an extraction tool to extract an RC file therefrom as shown at 406. The extraction tool may process the place and route netlist and may determine the resistance, capacitance, or any other parameters selected by the designer, for each net in the design. For example, the extraction tool may determined the capacitance of a particular net by calculating the input load capacitance for each gate connected to the net, and may further determine the capacitance between a corresponding route and any other layer within the design, including the substrate. That is, the extraction tool may determine what layers the particular route overlaps, and may calculate the capacitance generated therebetween.

To provide accurate results, the extraction tool is often provided with technology specific parameters including oxide thicknesses between metal layers, the permittivity of each of the oxide layers, etc. These technology specific parameters are often stored in a technology file, which may be read by the extraction tool.

After the extraction tool provides an RC file for the design, the RC file and the original netlist may be provided to a timing analysis tool as shown at 410. The timing analysis tool processes the netlist and the RC file to determine the timing of predetermined circuit paths within the design. Part of the pre-processing performed by the timing analysis tool is to read the timing information from the component library for each of the cells used in the design. For example, the timing information stored in the component library may include parameters such as a base delay, and delay per unit of capacitance. The timing analysis tool may use the timing information, along with the RC file to determine the delay for each cell within the design. Thereafter, the timing analysis tool identifies predetermined timing paths within the design, and adds the delay for each of the cells to determine an overall path delay for each timing path. The timing analysis tool may then report all timing paths that have an overall path delay that falls outside of a predetermined timing specification. That is, the timing analysis tool may determine if any timing violations exist.

If no timing violations exist, the design is deemed to meet the predefined specification and the method is exited as shown at 422 via interface 420. That is, during the first design iteration, it is not necessary to auto place and route the design again because no modifications have been made to the design database. If, however, the timing analysis tool identifies timing violations, the designer must evaluate each timing violation, and provide corrections to the design database to overcome such timing violations.

To mitigate any timing violations that may exist, a drive strength adjust means 426 may be provided for substituting selected components along selected timing paths with a corresponding logically equivalent component having a different drive strength. The drive strength adjust means 426 is further described above with reference to FIGS. 4–5.

After cells have been identified for substitution as shown at 426, a cell substitution list is created and provided to the extraction tool 406 via interface 434. The extraction tool 406 may process the original place and route netlist and the cell substitution list and may determine the resistance, capacitance, or any other parameters selected by the designer, for each net in the design.

Unlike the prior art, it is recognized that it is not necessary to repeat the place and route step 402 during each design iteration. That is, it is recognized that the placement-and routing of the design-does not significantly change, particularly when only cell substitutions are made to the design database. Further, it is recognized that the schematic need not be changed or expanded into a design netlist during each design iteration.

Rather, the extraction tool 406 may incorporate the cell substitution list provided by step 426 via interface 434, and may calculate an updated RC file based thereon. The updated RC file may then be used by the timing analysis tool 410 to determine if the updated design will meet the design specification. The process of extracting an RC file, performing timing analysis, and identifying cells for substitution may be repeated until the design falls within the design specification or until a predetermined number of design iterations have been achieved. After the design meets the design specification, a final place and route may be performed as shown at 418, and the method may be exited as shown at 422.

Figure 7:
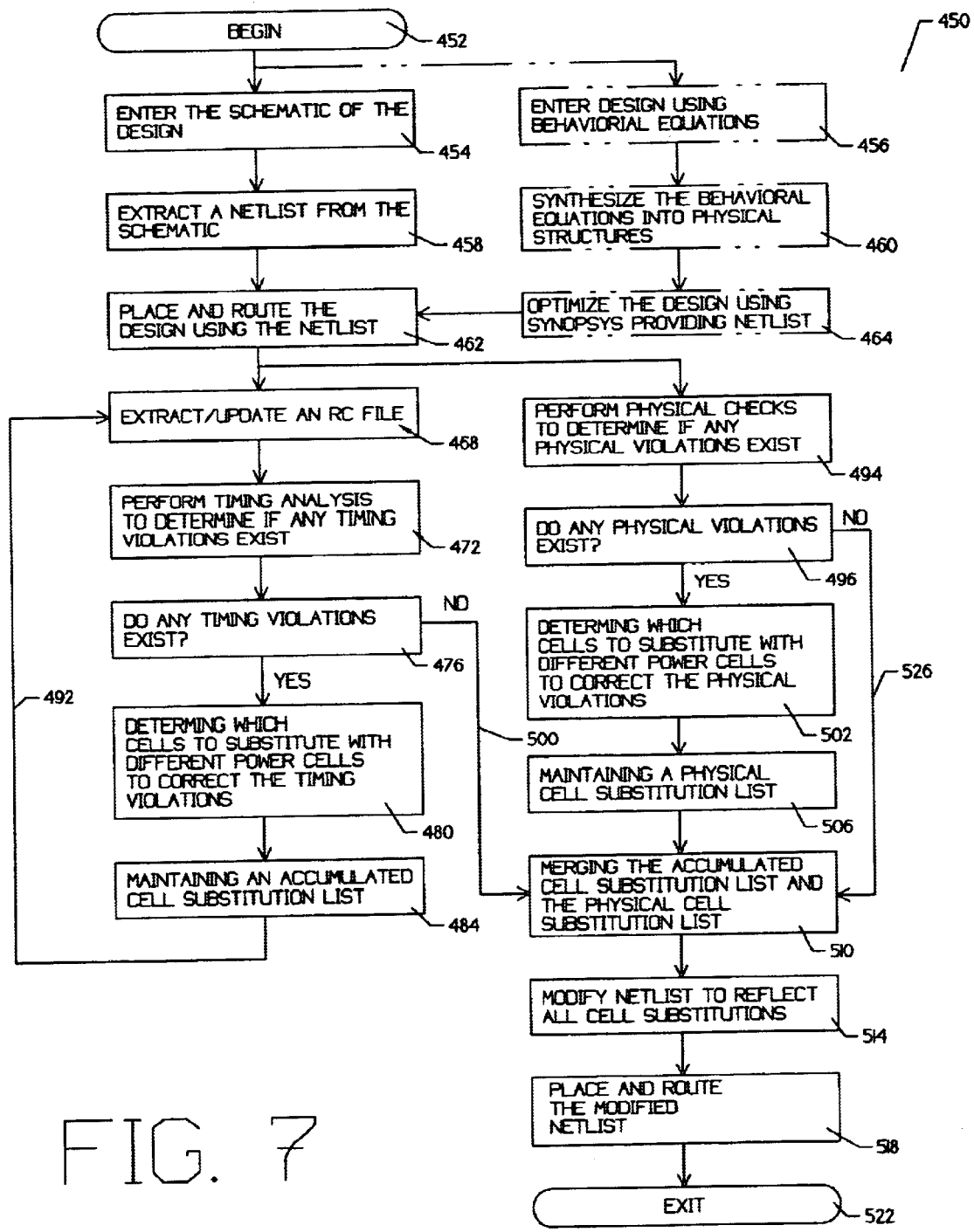
FIG. 7 is a flow diagram showing second improved design method.

FIG. 7 is a flow diagram showing a second improved design method. The diagram is generally shown at 450. The method is entered at element 452. A logic designer typically enters a schematic into a design database as shown at 454, using selected components from a component library. The schematic is typically entered via a database editor running on an engineering workstation, and the design database is typically stored therein.

After the schematic has been entered into the design database, the schematic may be processed, or expanded, into a design netlist as shown at 458. The design netlist typically identifies each of the library cells that are used in the schematic, and further identifies the interconnections therebetween.

An alternative approach to entering the design into the design database involves using sophisticated synthesis tools. In such an approach, the designer enters logical equations describing the behavior (i.e., function) of the design as shown at 456. A first synthesis tool 460 implements the logical equations using logical cells from the component library. A second synthesis tool 464 may then minimize the logic using known techniques, and may attempt to optimize the design based on a number of predetermined factors. For example, the designer may direct the synthesis tool to optimize the design for speed, power, or some other factor.

The resulting design netlist may then be provided to a place and route tool as shown at 462. There are a number of place and route tools available on the market today. The place and route tool may read the "physical representation" of each cell within the design and place the physical representation within an imaginary two dimensional box. For integrated circuit designs, the imaginary box often corresponds to the outer periphery of the resulting integrated circuit die. Once all of the cells have been placed, the place and route tool interconnects the cells in accordance with the design netlist. Depending on the technology and the power bussing strategy of the component library, the place and route tool may provide the required interconnections (or routes) using up to five layers of metal.

In most large designs, the place and route netlist may be hierarchical in nature. Thus, the place and route netlist typically only identifies the placement coordinates of each of the cells within the design, and does not contain the actual physical representation of each cell. Rather, the place and route netlist contains pointers to the physical representations stored in the component library. Thus, if a particular cell is used a number of times within the design, only one copy of the physical representation is required to be stored. The place and route netlist typically also identifies the interconnections, or routes, by the coordinates of the starting, ending, and any other points where the route changes direction. Further, the width of the route is also identified.

After the place and route netlist is generated, the designer may use an extraction tool to extract an RC file therefrom as shown at 468. The extraction tool may process the place and route netlist and may determine the resistance, capacitance, or any other parameters selected by the designer, for each net in the design. For example, the extraction tool may determine the capacitance of a particular net by calculating the input load capacitance for each gate connected to the net, and may further determine the capacitance between a corresponding route and any other layer within the design, including the substrate. That is, the extraction tool may determine what layers the particular route overlaps, and may calculate the capacitance generated therebetween.

To provide accurate results, the extraction tool is often provided with technology specific parameters including oxide thicknesses between metal layers, the permittivity of each of the oxide layers, etc. These technology specific parameters are often stored in a technology file, which may be read by the extraction tool.

After the extraction tool provides an RC file for the design, the RC file and the original netlist may be provided to a timing analysis tool as shown at 472. The timing analysis tool processes the netlist and the RC file to determine the timing of predetermined circuit paths within the design. Part of the pre-processing performed by the timing analysis tool is to read the timing information from the component library for each of the cells used in the design. For example, the timing information stored in the component library may include parameters such as a base delay, and delay per unit of capacitance. The timing analysis tool may use the timing information, along with the RC file to determine the delay for each cell within the design. Thereafter, the timing analysis tool identifies predetermined timing paths within the design, and adds the delay for each of the cells to determine an overall path delay for each timing path. The timing analysis tool may then report all timing paths that have an overall path delay that falls outside of a predetermined timing specification. That is, the timing analysis tool may determine if any timing violations exist.

If no timing violations exist, the design is deemed to meet the predefined timing specification, and control is passed to step 510 via interface 500. If, however, the timing analysis tool identifies timing violations, the designer must evaluate each timing violation, and provide corrections to the design to overcome such timing violations.

To mitigate any timing violations that may exist, a drive strength adjust tool 480 may be provided for substituting selected components along selected timing paths with a corresponding logically equivalent component having a different drive strength. The drive strength adjust tool 480 is further described above with reference to FIGS. 4–5.

After cells have been identified for substitution by the drive strength adjust tool 480, an accumulated cell substitution list is created at shown at 484. The accumulated cell substitution list identifies the cells that are to be substituted for a given design iteration. The accumulated cell substitution list may be provided to the extraction tool 468 via interface 492. The extraction tool 468 may process the original place and route netlist and the accumulated cell substitution list and may determine the resistance, capacitance, or any other parameters selected by the designer, for each net in the design.

Unlike the prior art, it is recognized that it is not necessary to repeat the place and route step 462 during each design iteration. That is, it is recognized that the placement and routing of the design does not significantly change, particularly when only cell substitutions are made to the design database. Further, it is recognized that the schematic or behavioral equations need not be updated during each design iteration. Thus, the schematic need not be expanded or the behavioral equations need not be synthesized during each of the subsequent design iterations. This may significantly reduce the design cycle time.

In the exemplary embodiment, the extraction tool 468 may incorporate the accumulated cell substitution list provided by step 484, and may calculate an updated RC file based thereon. The updated RC file may then be used by the timing analysis tool 472 to determine if the updated design will meet the design specification. The process of extracting an RC file, performing timing analysis, identifying cells for substitution, and creating an accumulated cell substitution list may be repeated until the design falls within the design specification, or until a predetermined number of design iterations has been reached. In addition to the above, it is contemplated that the exemplary embodiment may perform physical checks on the circuit design as shown at 494. The physical checks step may indicate any physical check violations therein, as shown at 496. The physical checks step 494 may report a violation if, for example, the capacitance on a route exceeds a maximum capacitance value, the cross-talk between two routes exceeds a maximum cross-talk value, etc. If no physical checks violations exist, control is passed to step 510 via interface 526. If, however, physical checks violations exist, a second drive strength adjust step 502 may be provided for selecting cells to be substituted with a corresponding logically equivalent component having a different drive strength to mitigate such physical check violations.

It is contemplated that the cells selected by the second drive strength adjust step 502 may be recorded in a physical checks substitution list, as shown at 506. After the above described timing violation design iterations are complete, and the design meets the predetermined timing specification, a merging step 510 may merge the accumulated cell substitution list with the physical checks substitution list. It is contemplated that the merging step 510 may resolve any conflict between the accumulated cell substitution list with the physical checks substitution list, as described above.

An example of when a conflict may arise during the merging step 510 is when a particular cell is identified both by the drive strength adjust step 502 and the drive strength adjust step 480. That is, the accumulated cell substitution list may indicate that a particular cell is to be substituted with a logically equivalent cell having a first drive strength to correct a timing violation. The drive strength adjust step 502 may also identify the same cell and may indicate that the particular cell is to be substituted with a logically equivalent cell having a second drive strength to correct a physical checks violation. It is contemplated that the exemplary embodiment may resolve these and other conflicts. In a preferred embodiment, the conflict may be resolved using a predetermined priority scheme. Further details of the preferred priority scheme may be found in the above referenced U.S. patent application Ser. No. RA-3429, which is incorporated herein by reference.

After all conflicts are resolved, the merging step 510 may provide a final substitution list. In the exemplary embodiment, the final substitution list is used by the designer to modify the design database accordingly, as shown at 514. Thereafter, the modified design database is provided to the place and route tool as shown at 518, for final placement and routing. The exemplary method may then be exited as shown at 522.

Figure 8:
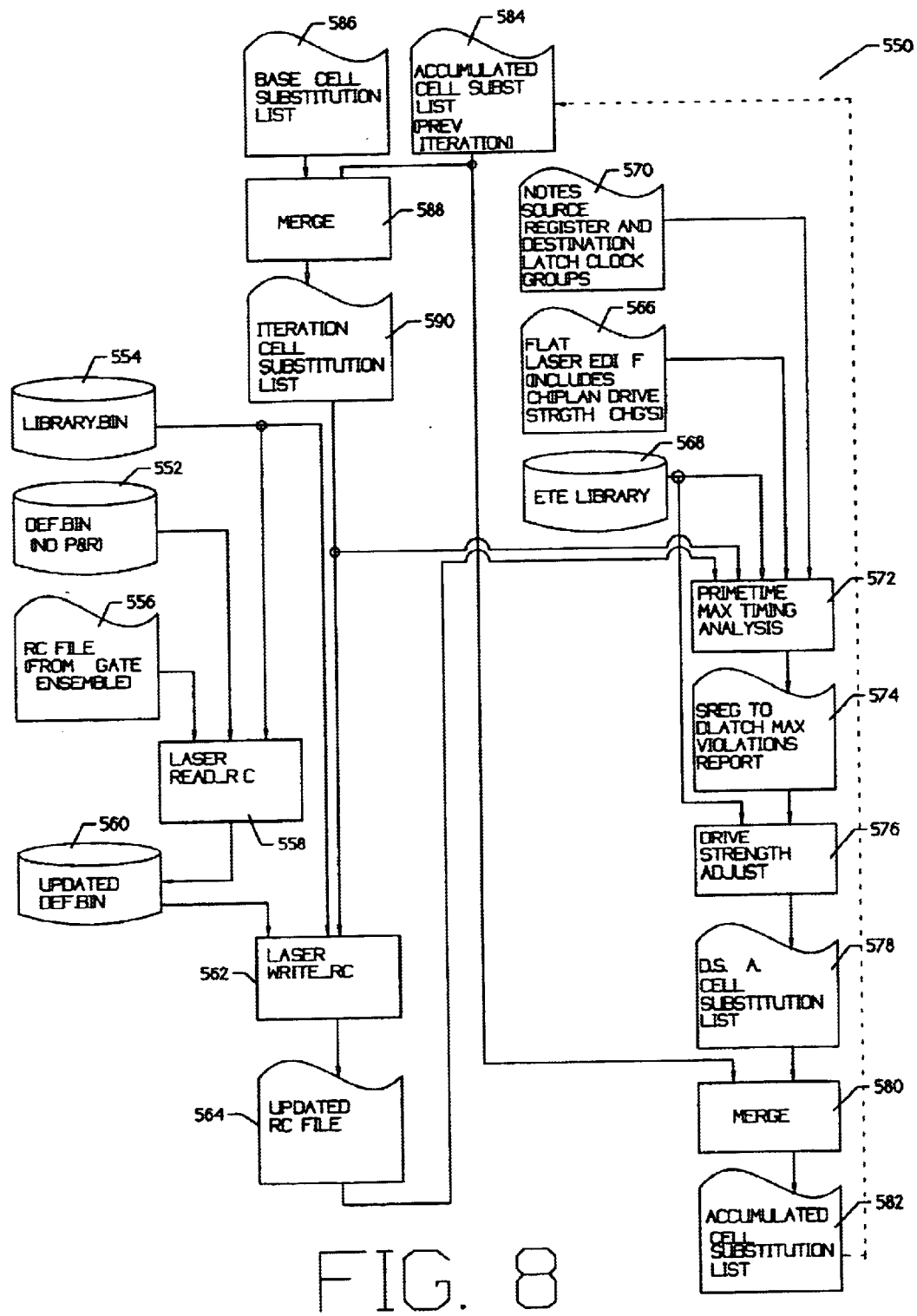
FIG. 8 is a flow diagram showing a third improved design method.

FIG. 8 is a flow diagram showing a third improved design method. The diagram is generally shown at 550. The circuit design database is shown at 552 wherein the designation DEF.BIN refers to a definition file (design database) stored in a data processing system. The design database 552 is the originally entered database, and contains no place and route information.

The design database is placed and routed using a place and route tool known as Gate Ensemble™ available from Cadence Design Systems. An RC file is extracted from the place and route database as shown at 556. Finally, a component library is provided as shown at 554. The component library may include a number of cells wherein each of the cells implements a different function. For example, the component library may include NAND gates, NOR gates, XOR gates, Registers, I/O cells, etc. Further, each of the individual cells may have a logically equivalent component with a different drive strength.

Finally, selected cells of the component library may have a number of "representations". For example, a cell may have a "symbolic representation", a "schematic representation", and a "physical representation" as described above.

The design database 552, the component library 554, and the RC file 556 are all provided to a tool called LASER. LASER is a tool developed by the assignee of the present invention to manipulate design database information. For example, the READ-RC module 558 of the LASER program reads the RC file, the design database, and the component library and provides an updated design database as shown at 560. The updated design database contains the RC information for each net within the design database.

The WRITE_RC module 562 of the LASER program reads the updated design database 560, the component library 554, and an iteration cell substitution list 590, and provides an updated RC file 564. During the first design iteration, the iteration cell substitution list 590 is empty.

The updated RC file is provided to a timing analysis tool known as PRIMETIME as shown at 572. PRIMETIME is a timing analysis tool provided by the assignee of the present invention. Besides reading the updated RC file, PRIMETIME may also read the iteration cell substitution list 590, an ETE library 568, Chiplan drive strength changes 566, and a file indicating selected source and destination register clock groups 570. The ETE library 568 is a file containing various characteristics of each cell in the component library 554 for the selected technology. For example, the ETE library 568 may include the delay information for each cell in the component library 554.

PRIMETIME 572 determines the timing of predetermined circuit paths within the design. In a preferred mode, PRIMETIME 572 determined the timing of the paths within and between each of the selected source and destination register clock groups 570. PRIMETIME 572 uses the ETE library 568 to determine the delay of each component with each timing path. That is, part of the preprocessing performed by PRIMETIME 572 is to read the timing information from the ETE library 568 for each of the cells used in the design. For example, the timing information stored in the ETE library 768 may include parameters such as a base delay, and delay per unit of capacitance. PRIMETIME 572 may use the timing information, along with the RC file to determine the delay for each cell within the design. Thereafter, the timing analysis tool identifies predetermined timing paths within the design, and adds the delay for each of the cells to determine an overall path delay for each timing path.

PRIMETIME 572 may then report all timing paths that have an overall path delay that falls outside of a predetermined timing specification as shown at 574. That is, the timing analysis tool may determine if any timing violations exist, and may store a record of the timing violations.

If PRIMETIME 572 identifies timing violations, the designer must evaluate each timing violation, and provide corrections to the design to overcome such timing violations. To mitigate any timing violations that may exist, a drive strength adjust tool 576 may be provided to identify selected components along selected timing paths to substitute with a corresponding logically equivalent component having a different drive strength. The drive strength adjust tool 576 is further described above with reference to FIGS. 4–5.

In a preferred embodiment, after selected cells have been identified for substitution by the drive strength adjust tool 576, a first merge program 580 merges the accumulated cell substitution list of the previous design iteration 584 with the drive strength adjust cell substitution list 578 recommended by the drive strength adjust tool 576, thereby resulting in an updated accumulation cell substitution list 582.

It is contemplated that the first merging program 580 may resolve any conflict between the accumulated cell substitution list of the previous iteration and the substitution list 578 provided by the drive strength adjust tool 576. An example of when a conflict may arise is when a particular cell is identified in more than one timing path during different design iterations. That is, the accumulated cell substitution list may identify a particular cell within a first timing path and may indicate that the particular cell is to be substituted with a logically equivalent cell having a first drive strength. The drive. strength adjust tool 576, and during the current design iteration, may also identify the same cell within a second timing path and may indicate that the particular cell is to be substituted with a logically equivalent cell having a second drive strength. It is contemplated that the first merging program 580 may resolve this and other conflicts. In a preferred embodiment, the conflict is resolved based upon a predetermined priority scheme. Further details of the preferred priority scheme may be found in the above referenced U.S. patent application Ser. No. RA-3429 which is incorporated herein by reference.

The updated accumulated cell substitution list may then be merged with a base cell substitution list 586 as shown at 588. The base cell substitution list 586 is a master list of all existing cell substitutions, and provides the starting point from which future substitutions are made. The merging program 588 may resolve any conflicts that may exist between the accumulated cell substitution list and the base cell substitution list 586, as described above.

After all conflicts are resolved, the merging program 588 may provide an iteration cell substitution list 590. The iteration cell substitution list 590 may then be provided to the WRITE_RC module 562 of the LASER program and to PRIMETIME 572.

It is contemplated that the process of updating the RC file 556, running PRIMETIME 572, writing a timing violations report 574, executing the drive strength adjust tool 576, creating the drive strength adjust cell substitution list 578, merging the drive strength adjust cell substitution list with the accumulated cell substitution list from the previous iteration 580, providing an updated accumulated cell substitution list 584, merging the updated accumulated cell substitution list with the base cell substitution list 588, and providing an iteration cell substitution list 590 may be repeated until the design meets the desired timing specification, or until a predetermined number of design iterations have been achieved.

Figure 9:
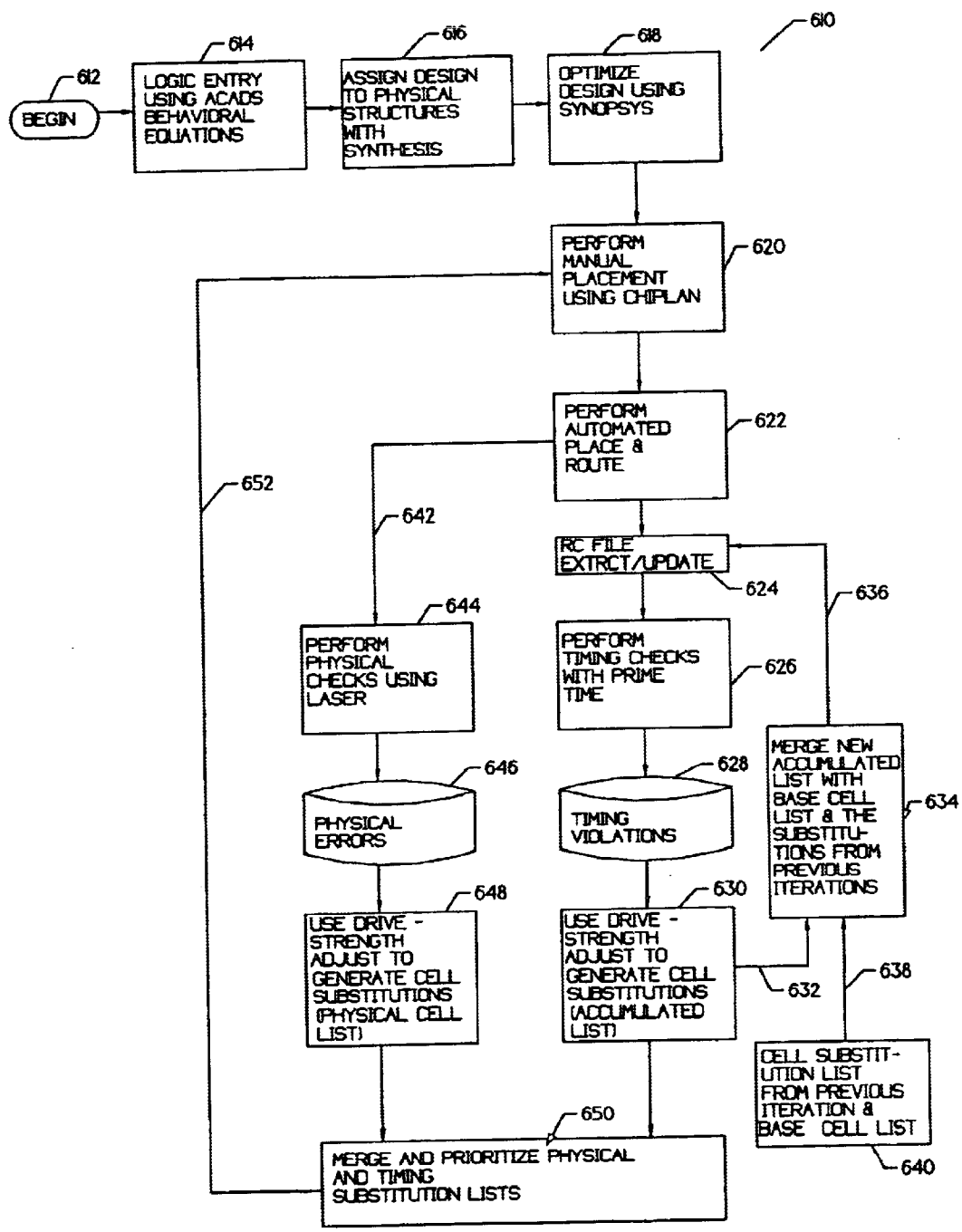
FIG. 9 is a flow diagram showing a fourth improved design method.

FIG. 9 is a flow diagram showing a fourth improved design method. The diagram is generally shown at 610. The method is entered at element 612. A logic designer typically enters logical equations describing the function of the design, as shown at 614. In the exemplary embodiment, logic entry is performed using HCADS Design Capture Software available from the Unisys Corporation. A first synthesis tool 616 may then implement the logical equations using logical cells from a component library. A second synthesis tool 618 may then minimize the logic using known techniques, and may attempt to optimize the design based on a number of predetermined factors. For example, the designer may direct the synthesis tool to optimize the design for speed, power, or some other factor. In the exemplary embodiment, a widely known synthesis tool called SYNOPSYS™ is used. The output of the second synthesis tool may be a design netlist, and preferably in the EDIF format.

The resulting design netlist may then be provided to a manual placement tool as shown at 620. In some cases, it is advantageous to manually place data paths, as well as certain critical cells within the design. The manual placement of these cells is typically accomplished via a placement (e.g., floor-planning tool). Stand alone floor-planning tools are available. However, many place and route tools have at least a limited floor-planning capability. After these cells are manually placed by the designer, the remaining cells may be automatically placed and routed by the place and route tool, as shown at 622.

After the place and route netlist is generated, the designer may use an extraction tool to extract an RC file therefrom as shown at 624. The extraction tool may process the place and route netlist and may determine the resistance, capacitance, or any other parameters selected by the designer, for each net in the design. For example, the extraction tool may determine the capacitance of a particular net by calculating the input load capacitance for each gate connected to the net, and may further determine the capacitance between a corresponding route and any other layer within the design, including the substrate. That is, the extraction tool may determine what layers the particular route overlaps, and may calculate the capacitance generated therebetween.

To provide accurate results, the extraction tool is often provided with technology specific parameters including oxide thicknesses between metal layers, the permittivity of each of the oxide layers, etc. These technology specific parameters are often stored in a technology file, which may be read by the extraction tool.

After the extraction tool provides an RC file for the design, the RC file and the original netlist may be provided to a timing analysis tool as shown at 626. The timing analysis tool processes the netlist and the RC file to determine the timing of predetermined circuit paths within the design. Part of the pre-processing performed by the timing analysis tool is to read the timing information from the component library for each of the cells used in the design. For example, the timing information stored in the component library may include parameters such as a base delay, and delay per unit of capacitance. The timing analysis tool may use the timing information, along with the RC file to determine the delay for each cell within the design. Thereafter, the timing analysis tool identifies predetermined timing paths within the design, and adds the delay for each of the cells to determine an overall path delay for each timing path. The timing analysis tool may then report all timing paths that have an overall path delay that falls outside of a predetermined timing specification. That is, the timing analysis tool may determine if any timing violations exist, and may store a record of the timing violations as shown at 628.

If the timing analysis tool identifies timing violations, the designer must evaluate each timing violation, and provide corrections to the design to overcome such timing violations. To mitigate any timing violations that may exist, a first drive strength adjust tool 630 may be provided to identify selected components along selected timing paths to substitute with a corresponding logically equivalent component having a different drive strength, at the expense of a potential increase in size. The first drive strength adjust tool 630 is further described above with reference to FIGS. 4–5.

After selected cells have been identified for substitution by the first drive strength adjust tool 630, an accumulated cell substitution list is created. The accumulated cell substitution list identifies the cells that are to be substituted during the present design iteration. The accumulated cell substitution list may be provided to a first merging step 634 via interface 632. Further, a base cell substitution list is provided to the first merging step 634 via interface 638. In the exemplary embodiment, the base cell substitution list is updated each design iteration and thus contains a master list of all cell substitutions.

The first merging step 634 merges the accumulated cell substitution list with the base cell substitution list thereby resulting in an updated base cell substitution list.

It is contemplated that the first merging step 634 may resolve any conflict between the accumulated cell substitution list and the base cell substitution list. An cell is identified in more than one timing path during different design iterations. That is, the base cell substitution list may identify a particular cell within a first timing path and may indicate that the particular cell is to be substituted with a logically equivalent cell having a first drive strength. The accumulated cell substitution list, and during the current design iteration, may also identify the same cell within a second timing path and may indicate that the particular cell is to be substituted with a logically equivalent cell having a second drive strength. It is contemplated that the first merging step 634 may resolve this and other conflicts. In a preferred embodiment, the conflict is resolved based upon a predetermined priority scheme. Further details of the preferred priority scheme may be found in the above referenced U.S. patent application Ser. No. RA-3429, which is incorporated herein by reference.

The updated base cell substitution list may be provided to the extracting tool 624, wherein an updated RC file may be generated and provided to the timing analysis tool 626 for the next design iteration. The extraction tool 624 may process the original place and route netlist and the updated base cell substitution list and may determine the resistance, capacitance, or any other parameters selected by the designer, for each net in the design.

Unlike the prior art, it is recognized that it is not necessary to repeat the place and route step 622 during each design iteration. That is, it is recognized that the placement and routing of the design does not significantly change, particularly when only cell substitutions are made to the design database. Further, it is recognized that the behavioral equations need not be updated during each design iteration. Thus, the behavioral equations need not be synthesized during each of the subsequent design iterations. This may significantly reduce the design cycle time.

In the exemplary embodiment, the process of extracting an RC file, performing timing analysis, identifying cells for substitution, creating an accumulated cell substitution list, and merging the accumulated cell substitution list with the base cell substitution list may be repeated until the design falls within the design specification, or until a predetermined number of design iterations has been reached.

In addition to the above, it is contemplated that the exemplary embodiment may perform physical checks on the circuit design as shown at 644. The physical checks step 644 may indicate any physical check violations therein, and the physical check violations may be stored as shown at 646.

If physical checks violations are detected, a second drive strength adjust tool 648 may be provided for selecting cells for substitution with a corresponding logically equivalent component having a different drive strength to mitigate such physical check violations. It is contemplated that the cells selected by the second drive strength adjust step 648 may be recorded in a physical checks substitution list as shown at 648.

After the above described timing violation design iterations are complete, and the design meets the predetermined timing specification, a second merging step 650 may merge the accumulated cell substitution list with the physical checks substitution list. It is contemplated that the second merging step 650 may resolve any conflict between the accumulated cell substitution list and the physical checks substitution list, as described above.

An example of when a conflict may arise during the second merging step 650 is when a particular cell is identified both by the first drive strength adjust tool 630 and the second drive strength adjust tool 648. That is, the accumulated cell substitution list may indicate that a particular cell is to be substituted with a logically equivalent cell having a first drive strength to correct a timing violation. The second drive strength adjust tool 648 may also identify the same cell and may indicate that the particular cell is to be substituted with a logically equivalent cell having a second drive strength to correct a physical checks violation. Preferably, these and other conflicts may be resolved using a predetermined priority scheme as described in U.S. patent application Ser. No. 08/597,931, entitled "Method and Apparatus for Resolving Conflicts Between Cell Substitution Recommendations Provided by a Drive Strength Adjust Tool", which has been incorporated herein by reference.

After all conflicts are resolved, the second merging step 650 may provide a final substitution list. In the exemplary embodiment, the final substitution list is provided to the floorplanning tool 620 (e.g., CHIPLAN) via interface 652. The floorplanning tool 620 may import and export cell substitution and/or cell selection lists. The cell substitution and/or cell selection lists may be used by the placement tool to substitute and/or modify the placement design database, rather than the original schematic or behavioral database. This may eliminate the need to re-synthesize and re-place and route the circuit design during each design iteration. The present invention further contemplates providing a reset feature which may reset the circuit design database to a previous state, if desired. The designer may then make the necessary modifications to the design database using the cell substitution lists. Thereafter, the design database may be provided to the place and route tool, for final placement and routing. The exemplary method may then be exited (not shown), or the process may be repeated to verify that the design database meets the circuit design specification. This is used as the initial conditions for the next design modification.

Figure 10:
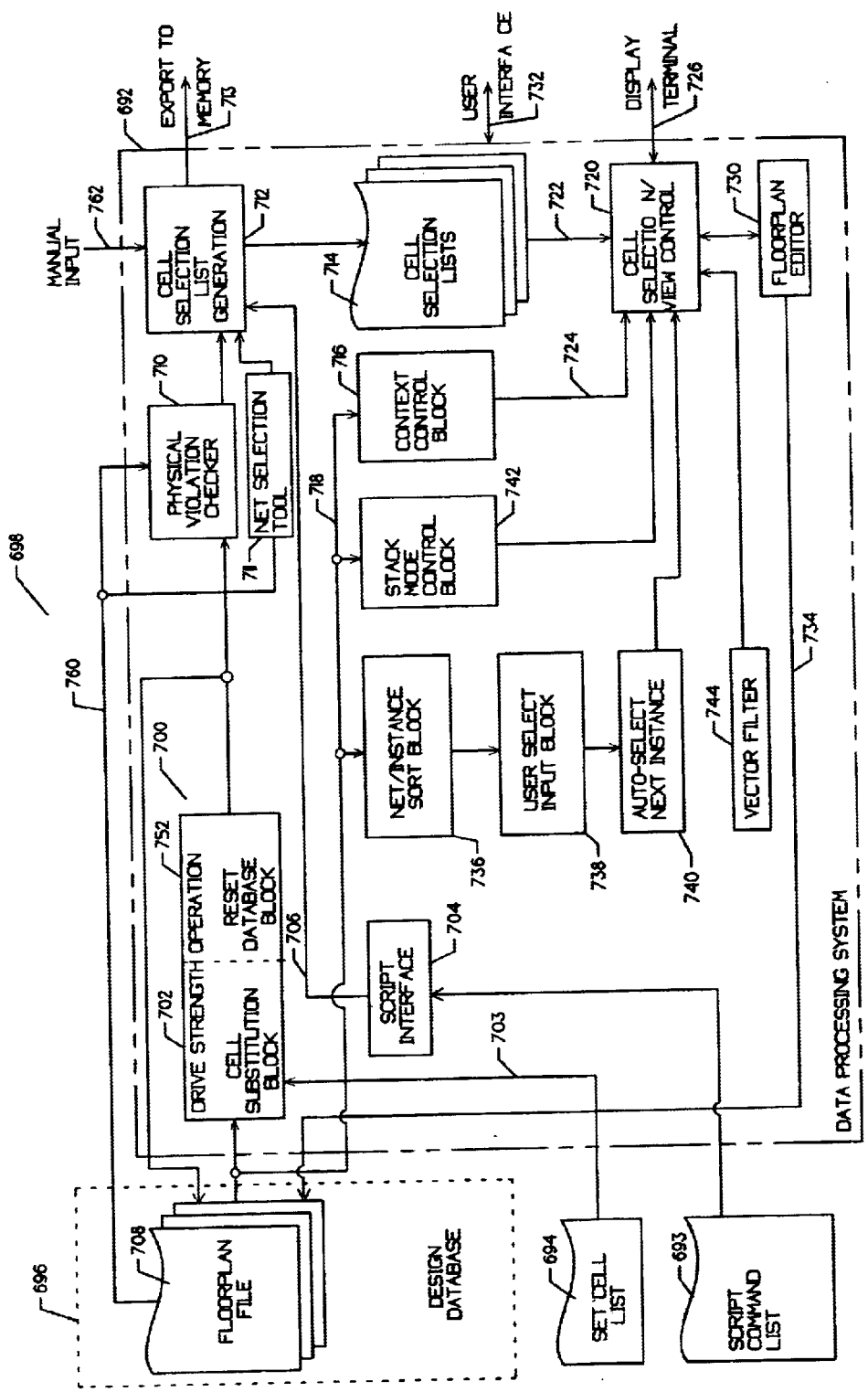
FIG. 10 is a block diagram of a first exemplary data processing system for affecting manual placement of a circuit design database, in accordance with the present invention.

FIG. 10 is a block diagram of a data processing system 692 for affecting placement of a circuit design in accordance with the present invention. The diagram is generally shown at 698. The data processing system 692 is coupled to a design database 696, a set cell list 694, and a script interface list 693. The design database 696 may include a floorplan file 708. The floorplan file 708 is part of the design database 696, but may include the information and data related to the floorplan (e.g., placement) of the circuit design. In a preferred embodiment, the floorplan file is the only part of the design database 696 that is updated or changed during the floorplanning process.

The generation of the set cell list 694 is described above and in U.S. patent application Ser. No. 08/598,506, filed Feb. 7, 1996 entitled "Method and Apparatus for Performing Drive Strength Adjust Optimization in a Circuit Design" and U.S. patent application Ser. No. 08/597,931, filed Feb. 7, 1996 entitled "Method and Apparatus for Resolving Conflicts Between Cell Substitution Recommendations Provided by a Drive Strength Adjust Tool", both of which have been incorporated herein by reference. The set cell list 694 contains a list of desired cell substitutions.

The set cell list 694 may be provided to a drive strength operations block 700, via interface 703. Cell substitution block 702 may read the floorplan file 708, and may substitute the specified cells with predetermined cells having a different performance characteristic. In a preferred embodiment, the set cell list 694 identifies certain cells within the current floorplan file 708, and identifies a corresponding cell having a different drive strength for substitution.

After substitution, the cell substitution block 702 writes the results back to the floorplan file 708. A number of previous revisions of floorplan file 708 may be saved, as shown. The floorplan file 708 thus includes the cell substitutions provided by cell substitution block. Because the cell substitution block 702 may only replace the data object within the floorplan file 708, and may not modify the placement of adjacent cells, some of the replacement cells may, for example, overlap adjacent cells or otherwise violate predefined placement rules. This may be particularly true if the replacement cells are physically larger than the original cells. See, for example, U.S. patent application Ser. No. 08/598,506, filed Feb. 7, 1996 entitled "Method and Apparatus for Performing Drive Strength Adjust Optimization in a Circuit Design", and U.S. patent application Ser. No. 08/597,931, filed Feb. 7, 1996 entitled "Method and Apparatus for Resolving Conflicts Between Cell Substitution Recommendations Provided by a Drive Strength Adjust Tool".

To detect physical violations caused by the cell substitution block 702, the floorplan file 708 may be provided to a physical violations checker block 710. The physical violations checker block 710 may detect predetermined physical violations in the floorplan file 708. The physical violations checker 710 may provide-the detected physical violations to a cell selection list generation block 712. The cell selection list generation block 712 may generate a list of cells that are involved in the detected physical violations. This may be controlled, at least in part, by script commands provided via interface 706. The resulting list of cells may be formatted into a cell selection list 714. It is contemplated that the cell selection list may also be provided by other input means including manual input interface 706, net;selection tool 711, or directly from the script interface 704 via interface 706. In any case, the cell selection list generating block 712 may export the cell selection list to a memory via interface 713.

In a preferred embodiment, the cell selection list 714 is a list of cells that are to be sequentially selected by the data processing system, thereby enabling a user to manually correct the detected physical violations. Thus, the cell selection list 714 may be provided to a cell selection/view control block 720. The cell selection/view control block 720 may sequentially select and display each of the cells in the cell selection list 714.

The cell selection/view control block 720 may be coupled to a display terminal via interface 726 and to a floorplan editor 730. The display terminal is used to display the current cell and surrounding cells. In a preferred embodiment, the cell selection/view control block 720 selects the current cell from the cell selection list 714, and zooms in and displays the current cell on the display device. Thereafter, the user may use the floorplan editor 730 via interface 732 to edit the floorplan file to correct the detected physical violation. After each of the cells identified in the cell selection list 714 has been sequentially operated upon by the cell selection/view control block, the user may direct the floorplan editor to store the floorplan file via interface 734. The above design process is also described in U.S. patent application Ser. No. 08/789,025, filed Jan. 27, 1997 entitled "Method and Apparatus for Efficiently Viewing a Number of Selected Components Using a Database Editor Tool".

The above method is extremely valuable, particularly since large number of errors may be detected by the physical violations checker block 710. In the past, a circuit designer typically manually located each violation by panning through the design in a floorplanning graphics window. Even when the exact location of a violation was known, navigating to that point could be slow, since the graphics terminal was often manipulating files containing tens of thousands of gates.

It is contemplated that the physical violations checker 710 may read the floorplan file 708 directly via interface 706. This may allow the physical violations checker 710 to detect violations in the floorplan file 708, without first performing a cell substitution. This may be particularly useful when the physical violations checker 710 can detect violations other than those caused by cell substitutions.

In some cases, a cell substitution may cause the performance of the design to decrease or otherwise not have the intended effect. Under these circumstances, it may be desirable to undo the cell substitutions made by cell substitution block 702, and revert back to the previous design iteration. A reset database block 752 may be provided to accomplish this task. The reset database block 752 may read the floorplan file 708, and may reset the floorplan file 708 back to a previous state.

A number of features may be incorporated into the data processing system to aid in the placement of the design database 696. A context control block 716 may read the floorplan file 708 via interface 718, and may set the current context to a selected hierarchical level. A context is a level of hierarchy within the design database, and often corresponds to a region. The working environment of a corresponding floorplanning tool may be set to the current context. By setting the working environment in this manner, only those cells or regions at one level below the context are displayed in a physical window (for example, a physical window that displays all unplaced cells). This feature may allow a circuit designer to work on a selected portion of the design, without having to sift through the cells and regions that are outside of the current context.

In addition to the above, providing a context as the working environment may make the selection of cells or regions within the context easier, especially if two or more regions overlap. That is, the floorplanning tool may select only those cells and regions that are within the current context. Cells and interconnect outside the current context are still visible. In a preferred embodiment, this is accomplished by enabling only those cells that are associated with the selected context for selection by the floorplanning tool.

It has been recognized that the selection of a region within a floorplanning window can be difficult, particularly when one or more regions overlap. To overcome this limitation, the context control block 716 may include a feature for maneuvering through the circuit design hierarchy, selecting cells or regions, and setting the context accordingly. In a preferred embodiment, this is accomplished by using predetermined up and down hot-keys. This feature may allow a circuit designer to select a predetermined context by selecting a cell or region known to be in a predetermined context, and then hitting an up hotkey to select the predetermined context. This feature may also allow a circuit designer to set the current context to a context lower in the design hierarchy by hitting a down hot-key. Thus, the up and down hot-key feature may allow a circuit designer to easily change the current context to a different hierarchical level from within the floorplanning window.

In contrast to the above, and in prior art placement tools, changing and selecting contexts within the floorplanning window was tedious, especially if regions overlapped. That is, and as indicated above, prior art tools typically cycled through the various overlapping regions until the desired region was finally located by the circuit designer. This was often slow and tedious because the regions were often large, including thousands of gates, and the selection process could involve loading the context information into local memory.

It is contemplated that the data processing system 692 may further include a net/instance sort block 736, a user select block 738, and an auto-select next instance block 740. The net/instance sort block 736 may sort un-placed cells and regions by instance name, and display the results in a physical window. By sorting the un-placed cells in a predetermined way (e.g. by a corresponding net name or instance name), the circuit designer may more easily find a desired cell or region for placement.

In prior floorplanning tools, and as indicated above, when a context was loaded, all of the children cells appeared as a pseudo random list of names in a physical window. Since large contexts often contained thousands of instance names, the physical window provided little utility during the placement process. The circuit designer simply had to scroll through the often lengthy list of instances in an attempt to identify the desired object. It was often more efficient for the circuit designer to determine an instance name by cross-referencing an external listing so that the name could be entered manually prior to placement.

A further advantage of the net/instance sort block 736 is that a circuit designer may more easily define object groups, thereby allowing user defined group operations to more readily be performed. For example, a circuit designer may place all drivers for a vectored net by first performing a net sort, and then placing the first component in the group and specifying a direction for further group placement. The floorplanning tool may then incorporate features that allow the circuit designer to place all remaining cells in the group automatically (see for example, U.S. patent application Ser. No. 08/789,703, filed Jan. 27, 1997, which has been incorporated herein by reference). In the past, this simple operation could require the circuit designer to manually find each instance name, either from some external printout or by panning through the unsorted list within a physical window, and individually place each object.

The user select input block 738 allows a circuit designer to select a desired cell or region from the sorted list of cells provided by net/instance sort block 736. Auto-select next instance block 740 automatically selects the next cell or region in the sorted list of cells, thus allowing the user to sequentially place the cells or regions one after another. It is recognized that this may be particularly useful for placing cells that drive or receive vectored nets.

The data processing system 692 may further include a stack mode control block 742. The stack mode control block 742 may read the design database 696 and detect which groups of cells or regions have been defined as a stack. In a preferred embodiment, the design database 696 includes information which identifies selected cells as belonging to a particular stack. Once the stacks are identified, the stack mode control block 742 may allow the user to perform group operations on the stack. For example, all cells in the stack may be moved by simply moving the stack. Further, all cells in the stack may be placed by placing a first one of the cells and indicating a placement direction and spacing for the remaining cells of the stack. The stack mode control block 742 may automatically place the remaining cells in the specified direction and at the specified spacing. The stack mode control block is more fully described in U.S. patent application Ser. No. 08/789,703, filed Jan. 27, 1997, entitled "Method and Apparatus for Associating Selected Circuit Instances and for Performing a Group Operation Thereon".

Finally, data processing system 692 may include a vector filter block 744. Vectored filter block 744 may be coupled to the cell selection/view control block 720. Vector filter block 744 may allow a user to view only those vectored nets that are wider than a predetermined threshold, narrower than a predetermined threshold, or fall within a predetermined range. This may reduce the visual complexity of the circuit design on the display device, and may allow the circuit designer to more effectively analyze vectored net paths. A further discussion of the vector filter 744 can be found in U.S. patent application Ser. No. 08/789,028, filed Jan. 27, 1997, entitled "Method and Apparatus for Selectively Viewing Nets Within a Database Editor Tool".

Figure 11:
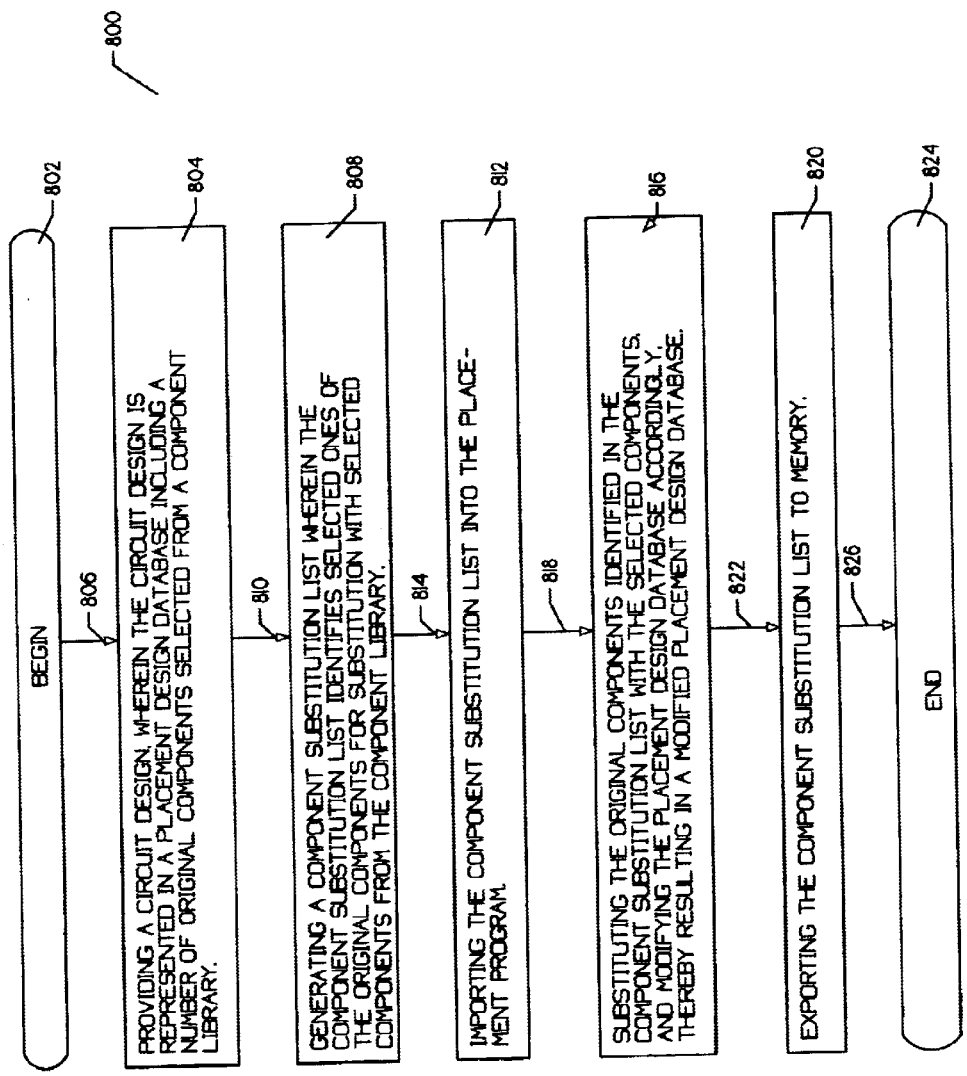
FIG. 11 is a flow diagram of a first exemplary method in accordance with the present invention.

FIG. 11 is a flow diagram of a first exemplary method in accordance with the present invention. The algorithm is generally shown at 800, and is entered at element 802. Control is passed to element 804 via interface 806. Element 804 provides a circuit design that is represented in a placement design database, and includes a number of original components selected from a component library. Control is passed to element 808 via interface 810. Element 808 generates a component substitution list that identifies selected ones of the original components for substitution with selected components from the component library. This may be accomplished in any number of ways, including those described above. Control is passed to element 812 via interface 814. Element 812 imports the component substitution list into a database editor tool. In a preferred embodiment, the database editor tool is a floorplanning tool. Control is then passed to element 816 via interface 818. Element 816 substitutes the original components identified in the component substitution list with the selected components, and modifies the placement design database accordingly, thereby resulting in a modified placement design database. Control is then passed to element 820 via interface 822. Element 820 exports the component substitution list to a memory. It is recognized that element 820 is optional, and may be used to document each cell substitution. Control is then passed to element 824 via interface 826, wherein the algorithm is exited.

Figure 12:
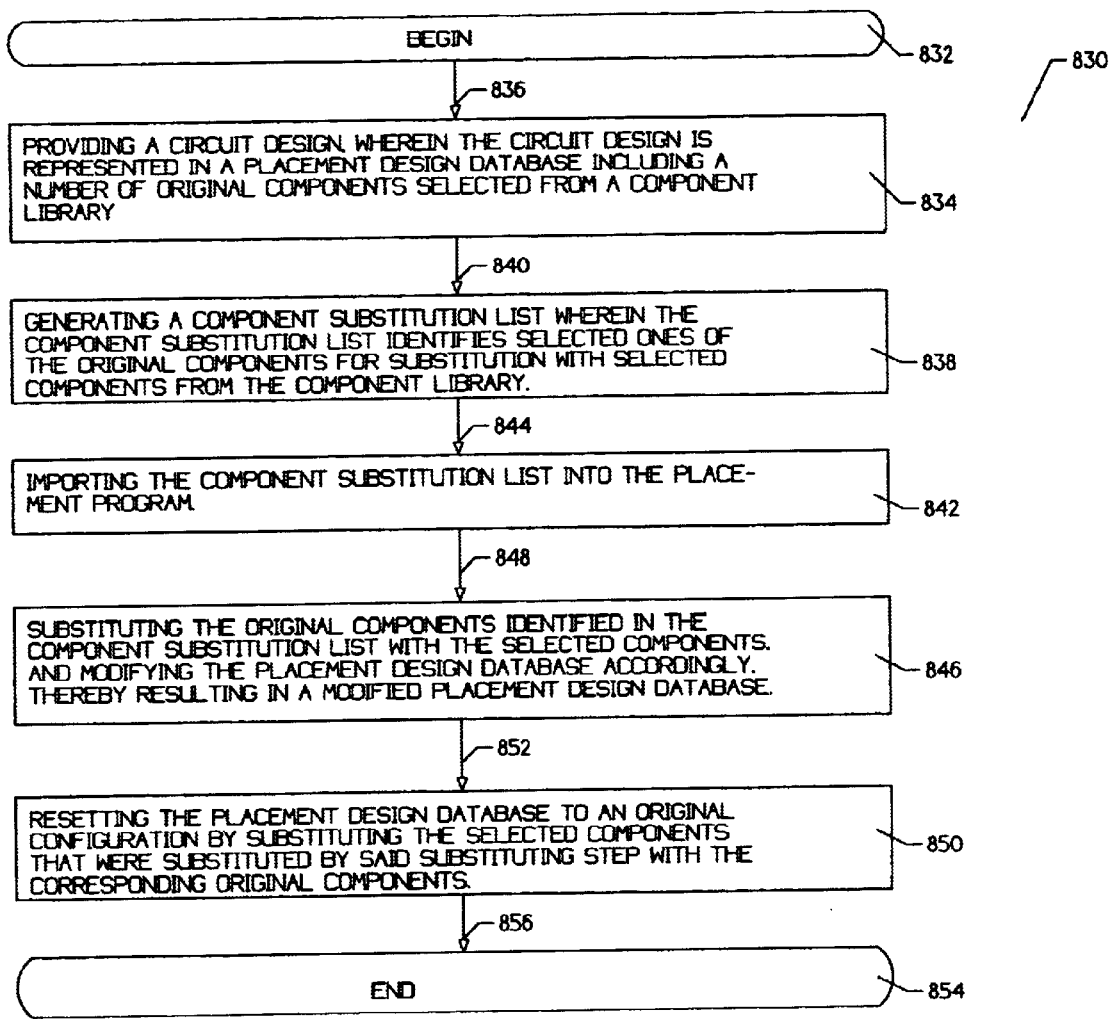
FIG. 12 is a flow diagram of a second exemplary method in accordance with the present invention.

FIG. 12 is a flow diagram of a second exemplary method in accordance with the present invention. The algorithm is generally shown at 830, and is entered at element 832. Control is passed to element 834 via interface 836. Element 834 provides a circuit design that is represented in a placement design database, including a number of original components selected from a component library. Control is passed to element 838 via interface 840. Element 838 generates a component substitution list that identifies selected ones of the original components for substitution with selected components from the component library. As indicated above, this may be accomplished in any number of ways, including those described above. Control is then passed to element 842 via interface 844. Element 842 imports the component substitution list into a database editor tool; and preferably, a floorplanning tool. Control is then passed to element 846 via interface 848. Element 846 substitutes the original components identified in the component substitution list with the selected components, and modifies the placement design database accordingly. This may result in a modified placement design database. Control is then passed to element 850 via interface 852. Element 850 resets the placement design database to an original configuration by substituting the selected components that were substituted in element 846 with the corresponding original components. This may be accomplished by reading a previous component substitution list from a memory, or by reading a previously stored version of the placement design database. Control is then passed to element 854 via interface 856, wherein the algorithm is exited.

Figure 13:
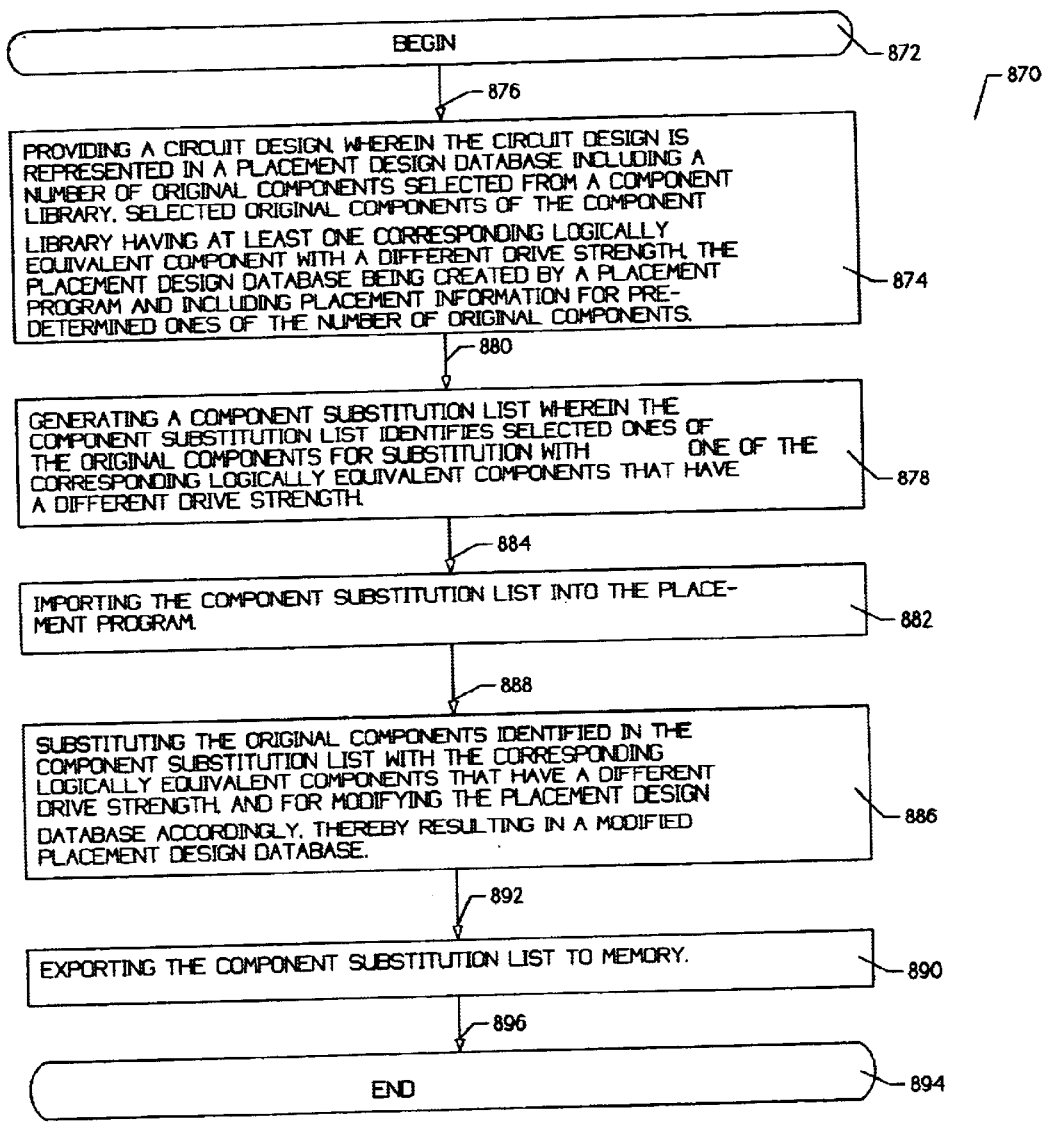
FIG. 13 is a flow diagram of a third exemplary method in accordance with the present invention.

FIG. 13 is a flow diagram of a third exemplary method in accordance with the present invention. The algorithm is generally shown at 870, and is entered at element 872. Control is passed to element 874 via interface 876. Element 874 provides a circuit design that is represented in a placement design database, and includes a number of original components selected from a component library. Selected original components of the component library may have at least one corresponding logically equivalent component with a different drive strength. Predetermined ones of the number of original components may have placement information associated therewith stored in the placement design database. Control is passed to element 878 via interface 880. Element 878 generates a component substitution list that identifies selected ones of the original components for substitution with one of the corresponding logically equivalent components that have a different drive strength. Control is then passed to element 882 via interface 884. Element 882 imports the component substitution list into a placement tool. Control is then passed to element 886 via interface 888. Element 886 substitutes the original components identified in the component substitution list with the corresponding logically equivalent components that have a different drive strength. Element 886 may further modify the placement design database accordingly, thereby resulting in a modified placement design database. Control is then passed to element 890 via interface 892. Element 890 exports the component substitution list to a memory. Control is then passed to element 894 via interface 896, wherein the algorithm is exited.

Figure 14:
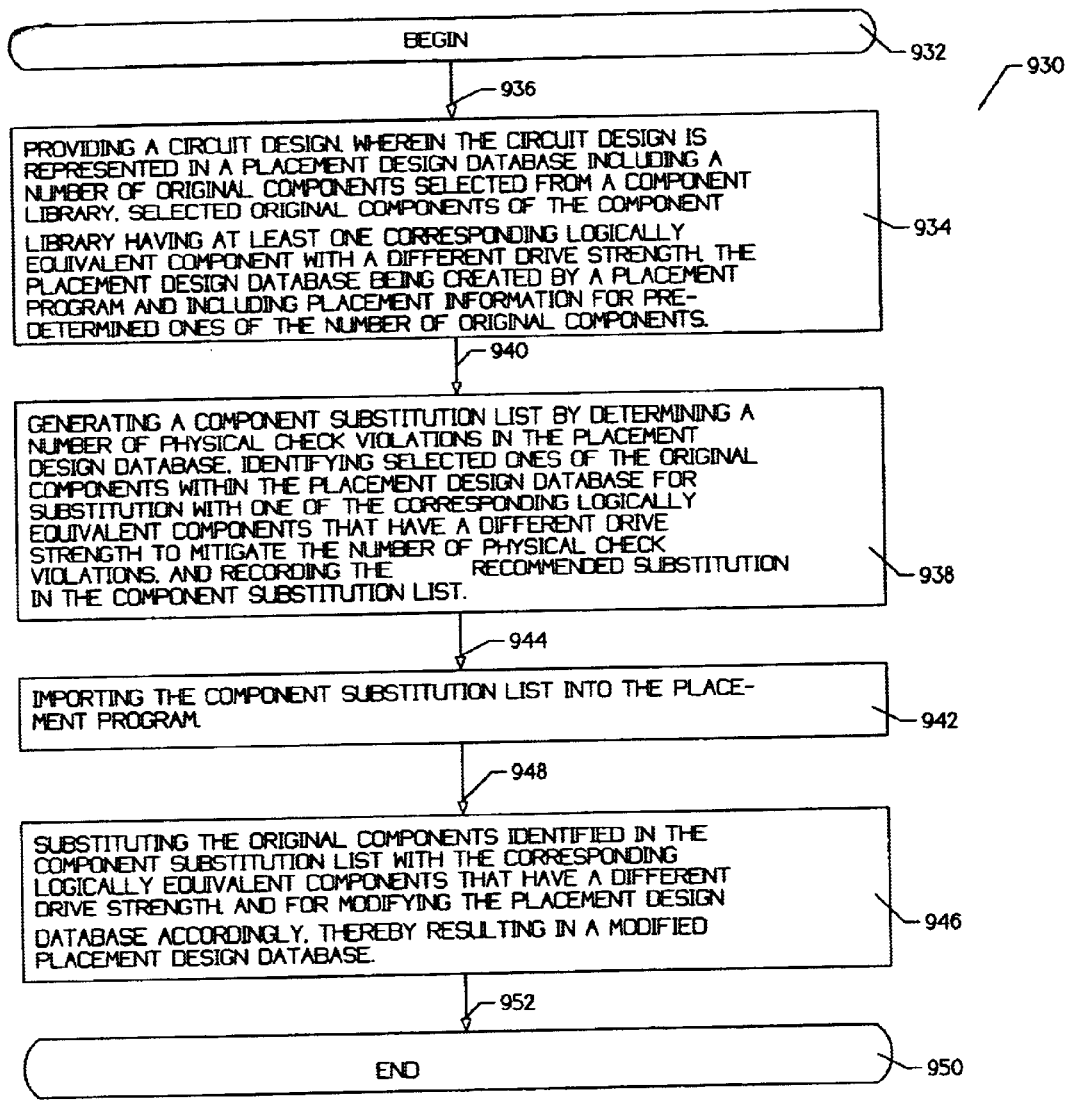
FIG. 14 is a flow diagram of a fourth exemplary method in accordance with the present invention.

FIG. 14 is a flow diagram of a fourth exemplary method in accordance with the present invention. The algorithm is generally shown at 900, and is entered at element 902. Control is passed to element 904 via interface 906. Element 904 provides a circuit design that is represented in a placement design database, including a number of original components selected from a component library. Selected original components of the component library may have at least one corresponding logically equivalent component with a different drive strength. It is contemplated that the placement design database may be created by a placement tool, and may include placement information for predetermined ones of the number of original components. Control is passed to element 908 via interface 910. Element 908 generates a component substitution list by determining a number of timing paths within the placement design database that do not meet predetermined specifications, as described above. Element 908 identifies selected ones of the original components along the number of timing paths for substitution with corresponding logically equivalent components that have a different drive strength. Element 908 may also record the recommended substitutions in the component substitution list. Control is passed to element 912 via interface 914. Element 912 imports the component substitution list into the placement tool. Control is passed to element 916 via interface 918. Element 916 substitutes the original components identified in the component substitution list with the corresponding logically equivalent components that have a different drive strength. Element 916 may also modify the placement design database accordingly, thereby resulting in a modified placement design database. Control is then passed to element 920 via interface 922, wherein the algorithm is exited.

Figure 15:
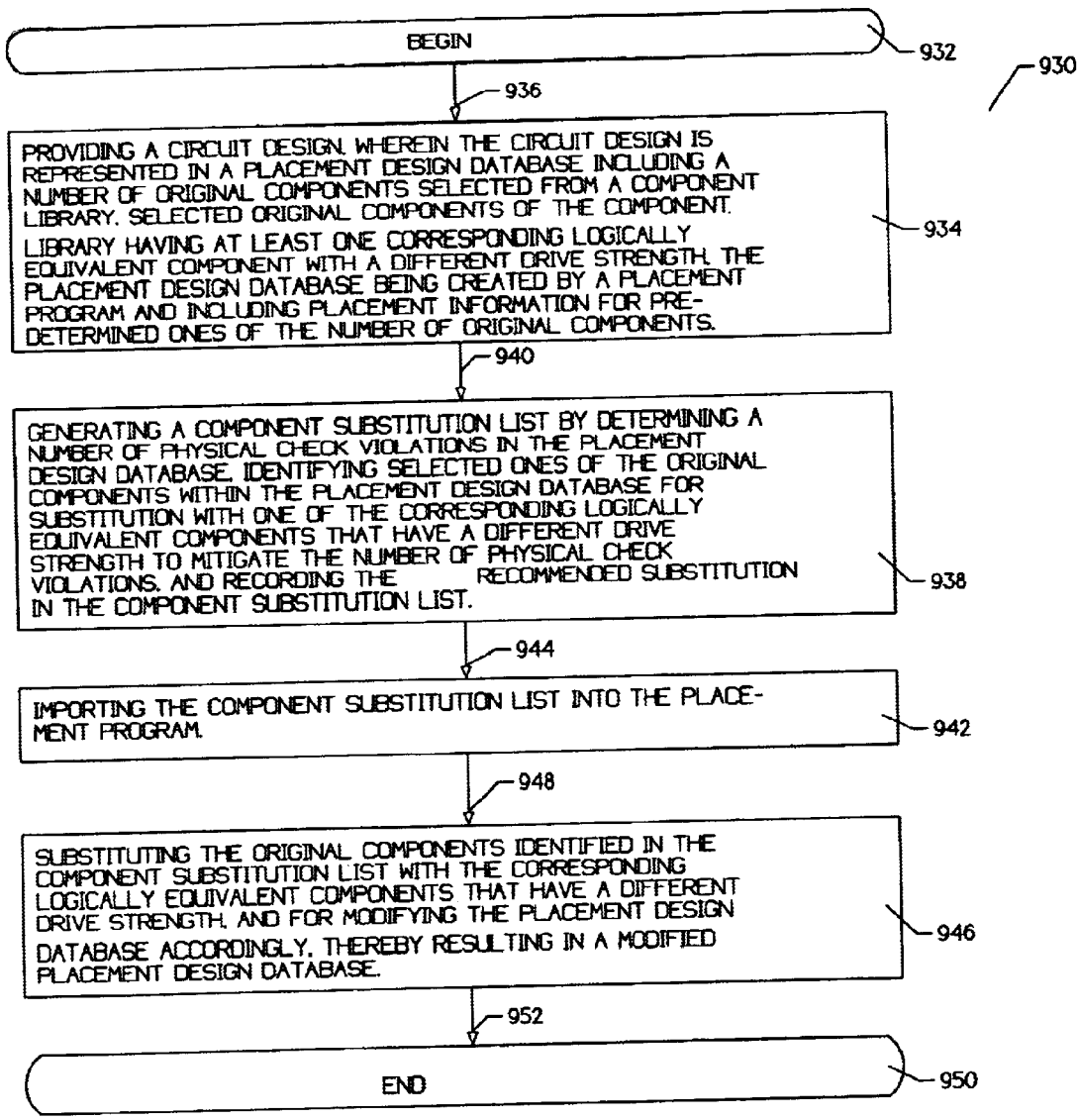
FIG. 15 is a flow diagram of a fifth exemplary method in accordance with the present invention.

FIG. 15 is a flow diagram of a fifth exemplary method in accordance with the present invention. The algorithm is generally shown at 930, and is entered at element 932. Control is passed to element 934 via interface 936. Element 934 provides a circuit design that is represented in a placement design database including a number of original components selected from a component library. Selected original components of the component library may have at least one corresponding logically equivalent component with a different drive strength. It is contemplated that the placement design database may be created by a placement tool, and may include placement information for predetermined ones of the number of original components. Control is passed to element 938 via interface 940. Element 938 generates a component substitution list by determining a number of physical check violations in the placement design database, as described above. Element 938 may further identify selected ones of the original components within the placement design database for substitution with one of the corresponding logically equivalent components that have a different drive strength to mitigate the number of physical check violations. Finally, element 938 may record the recommended substitutions in a component substitution list. Control is passed to element 942 via interface 944. Element 942 imports the component substitution list into the placement program or tool. Control is then passed to element 946 via interface 948. Element 946 substitutes the original components identified in the component substitution list with the corresponding logically equivalent components that have a different drive strength. Element 946 may also modify the placement design database accordingly, thereby resulting in a modified placement design database. Control is passed to element 950 via interface 952, wherein the algorithm is exited.

Figure 16:
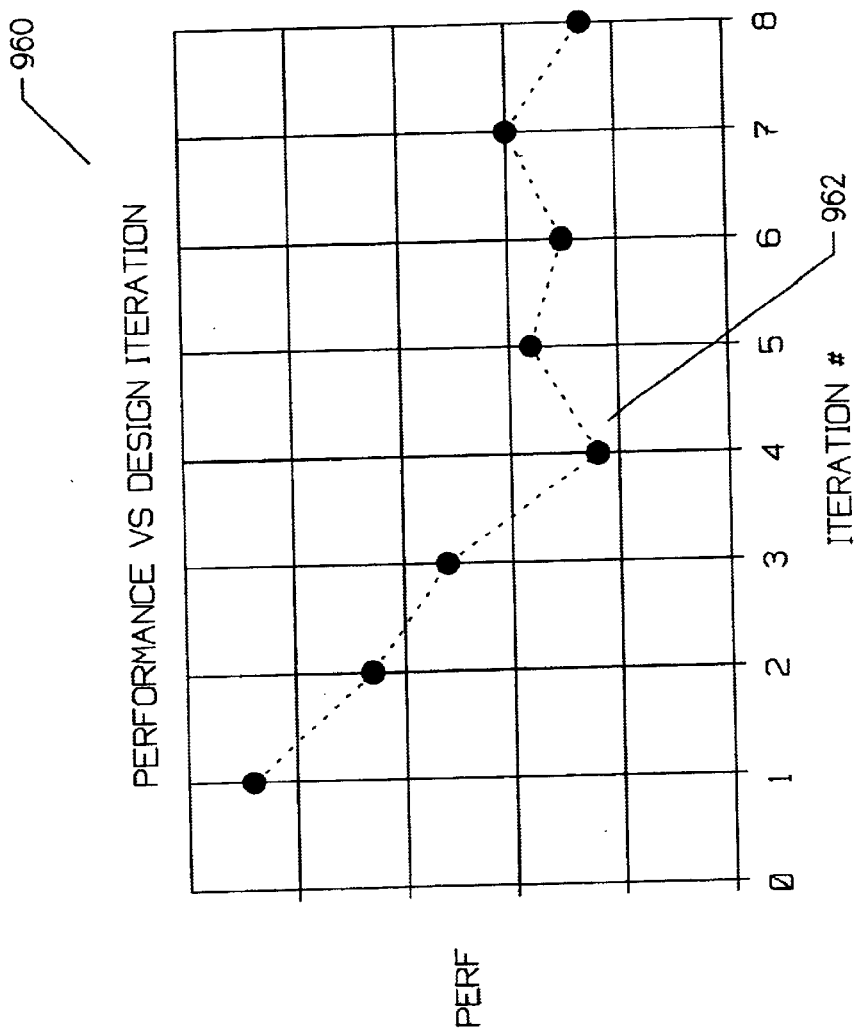
FIG. 16 is a chart that illustrates the performance of an exemplary circuit design versus design iteration number.

FIG. 16 is a chart that illustrates the performance of an exemplary circuit design versus design iteration number. The chart is generally shown at 960. The y-axis of the chart shows the performance of an exemplary circuit design. The term "performance" here means a measure of the circuit performance, for example, the worst case propagation time between registers. The x-axis shows a number of successive design iterations.

During a first design iteration, the circuit design may not yet be optimized, and the performance may be relatively slow. During successive iterations, using the cell substitution methods discussed above, the circuit design may become optimized, and the performance may improve, as shown at iterations 1–4. It is recognized, however, that there is often a point 962 where additional design iteration may actually cause the performance of the circuit design to decrease. This is shown at iterations 5–8. In many cases the performance of the design may oscillate with additional design iterations, as shown.

For these reasons, it may be important to be able to reconstruct the state of a design database at a selected design iteration. This may be accomplished by storing the full design database after each iteration. Alternatively, the cell substitution lists for each of the design iterations may be stored to a memory or the like. By using the previous cell substitution lists, the state of the database for any selected design iteration may be reconstructed. For example, after iteration number 8, the circuit designer may decide that iteration number 4 achieved the best performance. By using the cell substitution lists that are stored for iterations 5–8, the state of the database at iteration number 4 may be successfully reconstructed.

Figure 17:
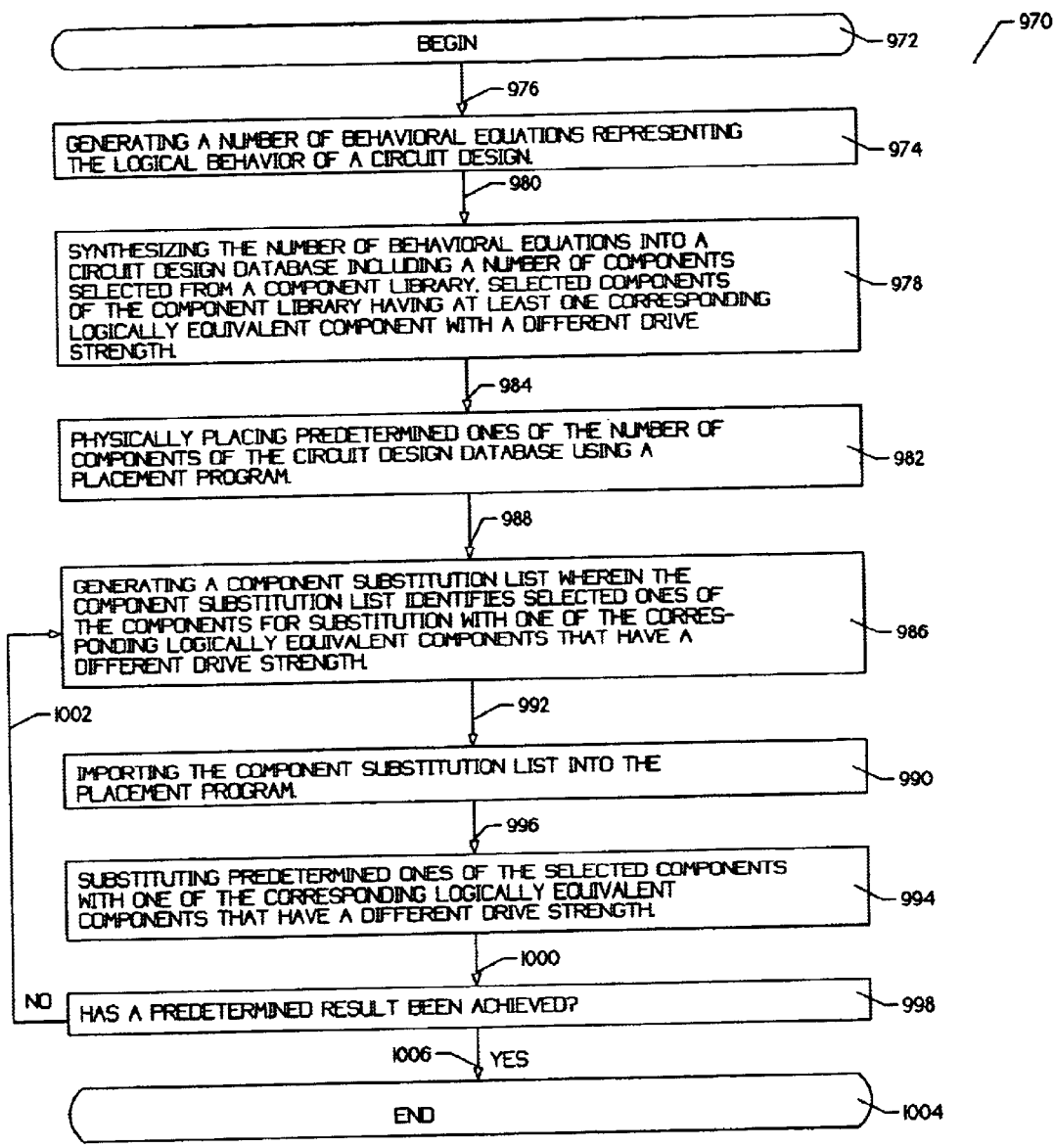
FIG. 17 is a flow diagram of a sixth exemplary method in accordance with the present invention.

FIG. 17 is a flow diagram of a sixth exemplary method in accordance with the present invention. The algorithm is generally shown at 970, and is entered at element 972. Control is passed to element 974 via interface 976. Element 974 generates a number of behavioral equations representing the logical behavior of a circuit design. Control is then passed to element 978 via interface 980. Element 978 synthesizes the number of behavioral equations into a circuit design database, including a number of components selected from a component library. Selected components of the component library may have at least one corresponding logically equivalent component with a different drive strength. Control is then passed to element 982 via interface 984. Element 982 physically places predetermined ones of the number of components of the circuit design database using a placement tool. In a preferred embodiment, this is performed manually by a circuit designer. Control is then passed to element 986 via interface 988. Element 986 generates a component substitution list that identifies selected ones of the components for substitution with one of the corresponding logically equivalent components that have a different drive strength. Control is then passed to element 990 via interface 992. Element 990 imports the component substitution list into the placement program or tool. Control is then passed to element 994 via interface 996. Element 994 substitutes predetermined ones of the selected components with one of the corresponding logically equivalent components that have a different drive strength. Control is then passed to element 998 via interface 1000. Element 998 determines whether a predetermined result has been achieved. If a predetermined result has not been achieved, control is passed back to element 986 via interface 1002, wherein another component substitution list is generated. If, however, a predetermined result has been achieved, control is passed to element 1004 via interface 1006, wherein the algorithm is exited.

Figure 18:
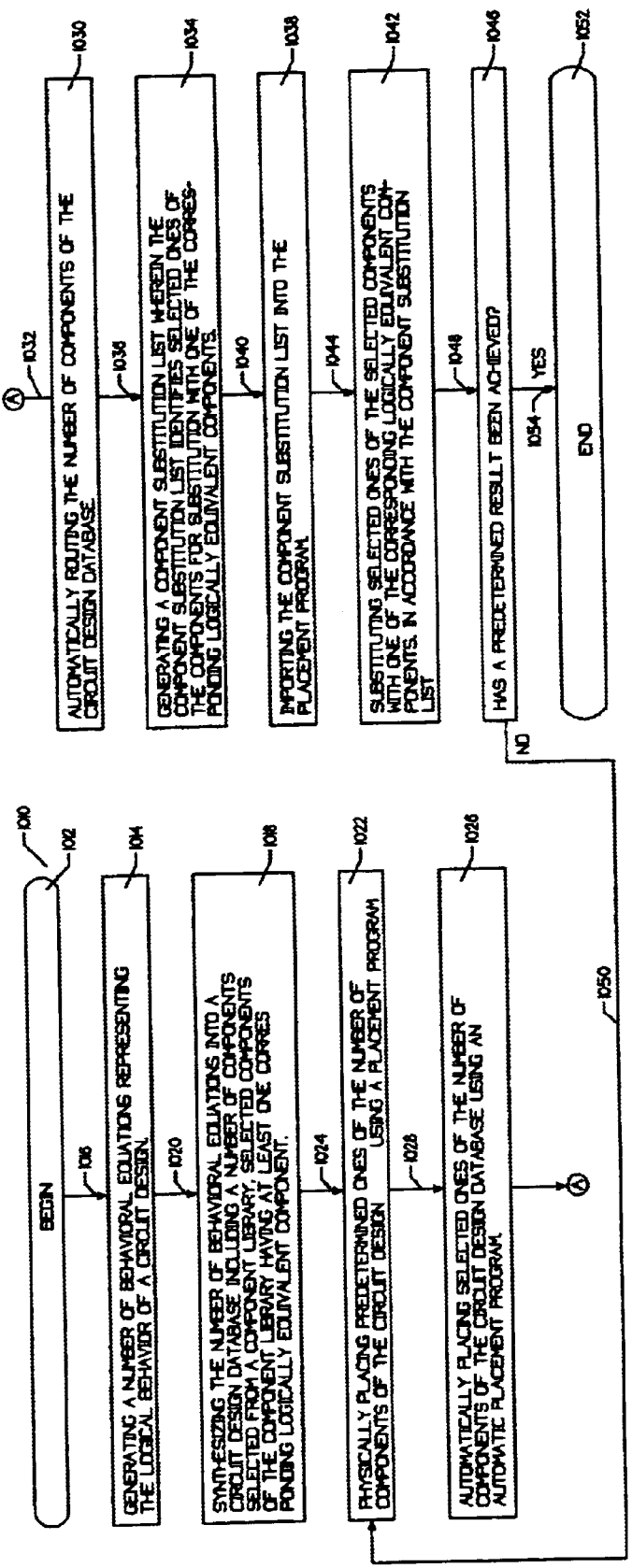
FIG. 18 is a flow diagram of a seventh exemplary method in accordance with the present invention.

FIG. 18 is a flow diagram of a seventh exemplary method in accordance with the present invention. The algorithm is generally shown at 1010 and is entered at element 1012. Control is passed to element 1014 via interface 1016. Element 1014 generates a number of behavioral equations representing the logical behavior of a circuit design. Control is then passed to element 1018 via interface 1020. Element 1018 synthesizes the number of behavioral equations into a circuit design database including a number of components selected from a component library. Selected components of the component library may have at least one corresponding logically equivalent component. Control is passed to element 1022 via interface 1024. Element 1022 physically places predetermined ones of the number of components of the circuit design using a placement tool. Control is then passed to element 1026 via interface 1028. Element 1026 automatically places selected ones of the number of components of the circuit design database using an automatic placement tool. Control is then passed to element 1030 via interface 1032. Element 1030 automatically routes the nets interconnecting the number of components of the circuit design database. Control is then passed to element 1034 via interface 1036. Element 1034 generates a component substitution list that identifies selected ones of the components for substitution with one of the corresponding logically equivalent components. Control is passed to element 1038 via interface 1040. Element 1038 imports the component substitution list into the placement program or tool. Control is then passed to element 1042 via interface 1044. Element 1042 substitutes selected ones of the selected components with one of the corresponding logically equivalent components, in accordance with the component substitution list. Control is then passed to element 1046 via interface 1048. Element 1046 determines whether a predetermined result has been achieved. If a predetermined result has not been achieved, control is passed back to element 1022 via interface 1050, wherein another component substitution list is generated. If, however, a predetermined result has been achieved, control is passed to element 1052 via interface 1054, wherein the algorithm is exited.

Figure 19:
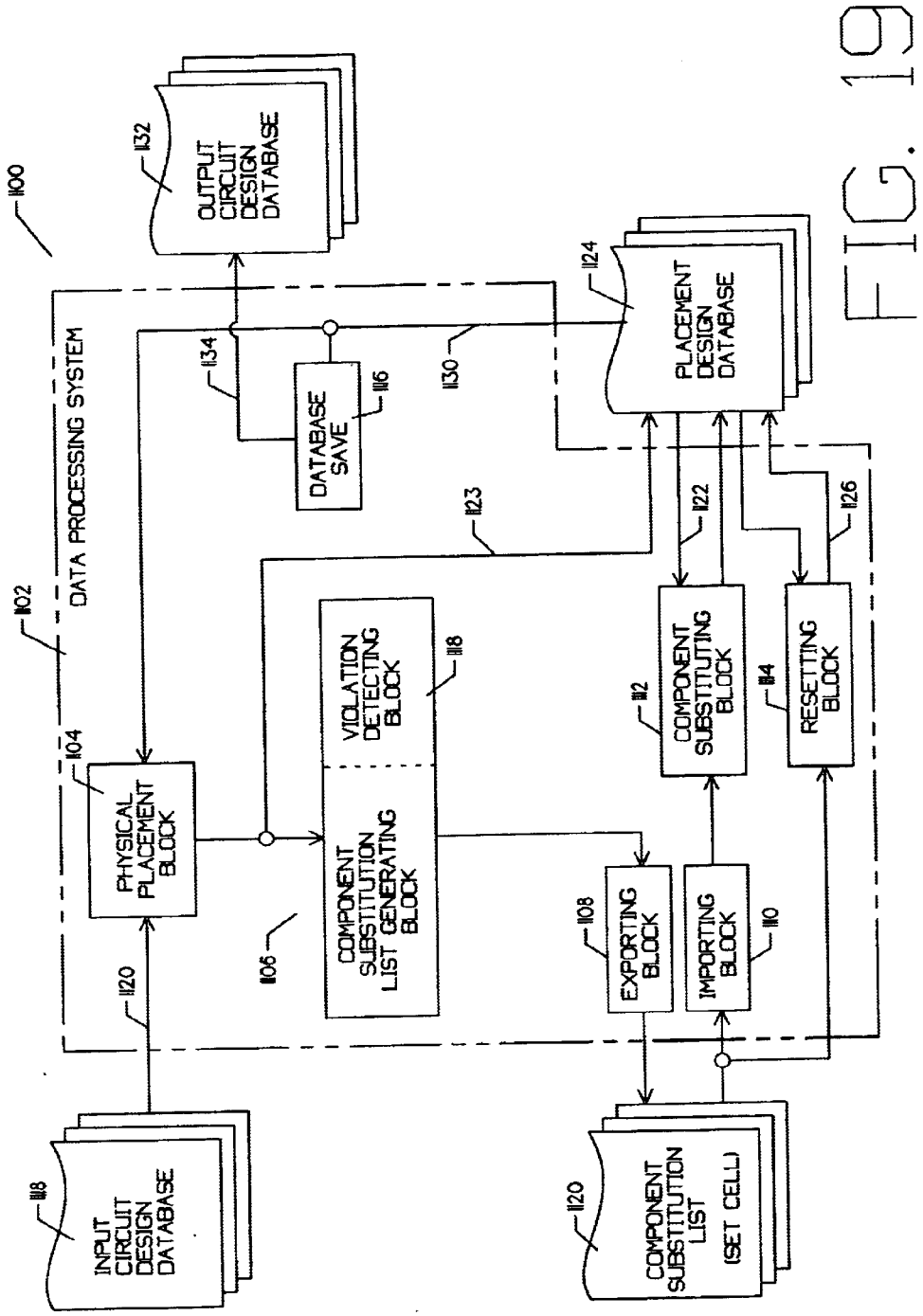
FIG. 19 is a block diagram of a second exemplary data processing system for manipulating the placement of selected cells, in accordance with the present invention.

FIG. 19 is a block-diagram of a second exemplary data processing system for manipulating the placement of selected cells, in accordance with the present invention. The diagram is generally shown at 1100, and includes a data processing system 1102. The data processing system 1102 may include a physical placement block 1104, a component substitution list generating block 1106, an exporting block 1108, an importing block 1110, a component substitution block 1112, a resetting block 1114 and a database save block 1116.

The physical placement block 1104 may initially read an input circuit design database 1118 via interface 1120. The physical placement block 1104 may place selected components in the circuit design database 1118. In a preferred embodiment, the data processing system may include a user interface (not shown), wherein a circuit designer may control the physical placement of the selected components. The physical placement block 1104 may store the placement information in the placement design database 1124 via interface 1123. In addition, the physical placement block 1104 may provide the placement information to the component substitution list generating block 1106.

The component substitution list generating block 1106 may identify selected cells within the circuit design database for substitution with logically equivalent components having a different drive strength. As described above, this may be accomplished by performing timing analysis on the circuit design, and identifying selected cells that may be substituted with logically equivalent cells having a different drive strength to improve the performance of the design. In addition, a violations detecting block 1118 may detect violations in the placement design database, and may identify selected cells that may be substituted with logically equivalent cells having a different drive strength to mitigate the violations. In either case, the component substitution list generating block 1106 may generate a cell substitution list.

The cell substitution list may be provided to exporting block 1108. The exporting block 1108 may store the cell substitution list to a memory or the like, as shown at 1120. The component substitution list 1120 may include a cell substitution list for any number of previous design iterations.

A selected component cell substitution list 1120 may be imported into the data processing system 1102 via importing block 1110. The importing block 1110 may provide the selected cell substitution list to component substitution block 1112. Component substitution block 1112 may read the placement design database 1124 via interface 1122, and substitute the components therein with the cells indicated in the selected cell substitution list. The component substitution block 1112 may then store the modified placement design database as another version of the placement design database 1124. It should be noted that a number of versions of the placement design databases may be stored in the placement design database 1124, as shown.

The modified placement design database may then be provided to physical placement block 1104 via interface 1130. The physical placement block 1104 may then correct any physical placement violations that are caused by the cell substitutions. For example, a cell substitution may increase the physical size of a cell, thereby causing the cell to overlap another cell that is placed adjacent thereto. After the physical violations are corrected, another iteration, as described above, may be performed.

It may be desirable to reset the placement design database 1124 to a previous state. For example, and as described with reference to FIG. 16, a previous design iteration may have produced a better performance characteristic for the circuit design. The resetting block 1114 may read both the previous component cell substitution lists 1120 and the current placement design database 1124, and may reset the placement design database to a previous state. This may be accomplished by un-doing the subsequent cell substitutions in the reverse order. The resetting block 1114 may then store the reset placement design database to placement design database 1124.

Once a desired result has been achieved, the placement design database 1124 may be stored as an output circuit design database. The placement design database 1124 may only temporarily store the placement information. However, once the design has achieved a desired result (e.g. performance), the placement information may be stored, via the database save block 1116. The output circuit design database 1132 may not contain any of the placement information related to the circuit design until the datasave block 1116 stores the placement information therein.

Having thus described the preferred embodiments of the present invention, those of skill in the art will readily appreciate that the teachings found herein may be applied to yet other embodiments within the scope of the claims hereto attached.

What is claimed is:

1. A method for correcting design violations in a circuit design, wherein the circuit design is represented in a circuit design database including a number of original components selected from a component library, selected original components of the component library having at least one corresponding logically equivalent component with a different drive strength, the circuit design database being created by a placement tool and including placement information for predetermined ones of the number of original components, the method comprising the steps of:

a. generating a component substitution list wherein the component substitution list identifies selected ones of the original components for substitution with one of the corresponding logically equivalent components that have a different drive strength;

b. importing the component substitution list into the placement tool; and c. substituting the original components identified in the component substitution list with the corresponding logically equivalent components that have a different drive strength, and for modifying the circuit design database accordingly, thereby resulting in a modified circuit design database.

2. A method according to claim 1 further comprising the step of exporting the component substitution list to memory.

3. A method according to claim 1 further comprising the step of resetting the circuit design database to an original configuration by substituting the selected components that were substituted by said substituting step with the corresponding original components.

4. A method according to claim 1 further comprising the step of detecting a violation in the modified circuit design database.

5. A method according to claim 4 wherein said error is a physical overlap of predetermined components.

6. A method according to claim 1 further comprising the step of submitting the modified circuit design database to a place and route tool.

7. A method according to claim 1 wherein said generating step comprises determining a number of timing paths within the circuit design database that do not meet a predetermined specification, said determining step identifying selected ones of the original components along the number of timing paths for substitution with one of the corresponding logically equivalent components that have a different drive strength, and for recording the substitution in the component substitution list.

8. A method according to claim 1 wherein said generating step comprises determining a number of physical check violations in the circuit design database, said determining step identifying selected ones of the original components within the circuit design database for substitution with one of the corresponding logically equivalent components that have a different drive strength to mitigate the number of physical check violations, and for recording the substitution in the component substitution list.

9. A method for correcting design violations in a circuit design, the method comprising the steps of:
   a. generating a number of behavioral equations representing the logical behavior of the circuit design;
   b. synthesizing the number of behavioral equations into a circuit design database including a number of components selected from a component library, selected components of the component library having at least one corresponding logically equivalent component with a different drive strength;
   c. physically placing predetermined ones of the number of components of the circuit design database using a placement tool;
   d. generating a component substitution list wherein the component substitution list identifies selected ones of the components for substitution with one of the corresponding logically equivalent components that have a different drive strength;
   e. importing the component substitution list into the placement tool; and
   f. substituting predetermined ones of the selected components with one of the corresponding logically equivalent components that have a different drive strength.

10. A method according to claim 9 further comprising the step of repeating steps (d) through (f) a predetermined number of times.

11. A method according to claim 9 further comprising the step of repeating steps (d) through (f) until a desired result is achieved.

12. A method for correcting design violations in a circuit design, the method comprising the steps of:
   a. generating a number of behavioral equations representing the logical behavior of the circuit design;
   b. synthesizing the number of behavioral equations into a circuit design database including a number of components selected from a component library, selected components of the component library having at least one corresponding logically equivalent component;
   c. physically placing predetermined ones of the number of components of the circuit design using a placement tool;
   d. automatically placing selected ones of the number of components of the circuit design database using an automatic placement tool;
   e. generating a component substitution list wherein the component substitution list identifies selected ones of the components for substitution with one of the corresponding logically equivalent components;
   f. importing the component substitution list into the placement tool; and
   g. substituting selected ones of the selected components with one of the corresponding logically equivalent components, in accordance with the component substitution list.

13. A method according to claim 12 wherein said placing step further comprises the step of automatically routing the number of components of the circuit design database.

14. A method according to claim 12 wherein steps (e) through (g) are repeated a predetermined number of times.

15. A method according to claim 12 wherein steps (e) through (g) are repeated until a desired result is achieved.

16. A method according to claim 12 wherein said generating step (e) includes the step of performing a number of physical checks of the circuit design database, thereby identifying a first set of selected components for substitution.

17. A method according to claim 12 wherein said generating step (e) includes the step of performing a number of timing checks of the circuit design database, thereby identifying a second set of selected components for substitution.

18. A method according to claim 12 wherein said generating step (e) includes the step of performing a number of physical checks of the circuit design database, thereby identifying a first set of selected components for substitution, and the step of performing a number of timing checks of the circuit design database, thereby identifying a second set of selected components for substitution.

19. A method according to claim 18 further comprising the step of merging the first set and second set of selected components into a merged substitution list.

20. A method according to claim 19 wherein said merging step further comprises the step of prioritizing the selected cell substitutions represented in the merged substitution list based on a predetermined priority scheme.

21. A data processing system for correcting design violations in a circuit design, wherein the circuit design is represented in a circuit design database including a number of original components selected from a component library comprising:
   a. generating means for generating a component substitution list wherein the component substitution list identifies selected ones of the original components for substitution with selected components from the component library;
   b. importing means coupled to said generating means for importing the component substitution list;
   c. substituting means coupled to said importing means for substituting the original components identified in the component substitution list with the selected components, and modifying the circuit design database accordingly, thereby resulting in a modified circuit design database; and
   d. means for exporting the component substitution list to memory.

22. A data processing system according to claim 21 further comprising storing means for storing the modified circuit design database to memory.

23. A data processing system according to claim 21 further comprising detecting means for detecting a violation in the modified circuit design database.

24. A data processing system according to claim 23 wherein said error is a physical overlap of predetermined components.

25. A data processing system for correcting design violations in a circuit design, wherein the circuit design is represented in a circuit design database including a number of original components selected from a component library comprising:
   a. generating means for generating a component substitution list wherein the component substitution list identifies selected ones of the original components for substitution with selected components from the component library;
   b. importing means coupled to said generating means for importing the component substitution list;
   c. substituting means coupled to said importing means for substituting the original components identified in the component substitution list with the selected components, and modifying the circuit design database accordingly, thereby resulting in a modified circuit design database; and d. resetting means for resetting the circuit design database to an original configuration by substituting the selected components that were substituted by said substituting means with the corresponding original components.

26. A data processing system according to claim 25 further comprising submitting means for submitting the modified circuit design database to a place and route means.

27. A data processing system for correcting design violations in a circuit design, wherein the circuit design is represented in a circuit design database including a number of original components selected from a component library, selected original components of the component library having at least one corresponding logically equivalent component with a different drive strength, the circuit design database including placement information for predetermined ones of the number of original components, the data processing system comprising:

a. generating means for generating a component substitution list wherein the component substitution list identifies selected ones of the original components for substitution with one of the corresponding logically equivalent components that have a different drive strength;

b. importing means coupled to said generating means for importing the component substitution list;

c. substituting means coupled to said importing means for substituting the original components identified in the component substitution list with the corresponding logically equivalent components that have a different drive strength, and for modifying the circuit design database accordingly, thereby resulting in a modified circuit design database; and d. export means for exporting the component substitution list to a memory within the data processing system.

28. A data processing system according to claim 27 wherein said generating means comprises a timing analysis means for determining a number of timing paths within the circuit design database that do not meet a predetermined specification, said timing analysis means identifying selected ones of the original components along the number of timing paths for substitution with one of the corresponding logically equivalent components that have a different drive strength, and for recording the substitution in the component substitution list.

29. A data processing system according to claim 27 wherein said generating means comprises a physical checks means for determining a number of physical check violations in the circuit design database, said physical checks means identifying selected ones of the original components within the circuit design database for substitution with one of the corresponding logically equivalent components that have a different drive strength to mitigate the number of physical check violations, and for recording the substitution in the component substitution list.

30. A data processing system for correcting design violations in a circuit design, wherein the circuit design is represented in a circuit design database including a number of original components selected from a component library, selected original components of the component library having at least one corresponding logically equivalent component with a different drive strength, the circuit design database including placement information for predetermined ones of the number of original components, the data processing system comprising:

a. generating means for generating a component substitution list wherein the component substitution list identifies selected ones of the original components for substitution with one of the corresponding logically equivalent components that have a different drive strength;

b. importing means coupled to said generating means for importing the component substitution list;

c. substituting means coupled to said importing means for substituting the original components identified in the component substitution list with the corresponding logically equivalent components that have a different drive strength, and for modifying the circuit design database accordingly, thereby resulting in a modified circuit design database; and d. reset means for resetting the circuit design database to an original configuration by substituting the selected components that were substituted by said substituting means with the corresponding original components.

31. A data processing system according to claim 30 further comprising error detection means for detecting a violation in the modified circuit design database.

32. A data processing system according to claim 31 wherein said error is a physical overlap of predetermined components.

33. A data processing system according to claim 30 wherein said modified circuit design database is submitted to a place and route means.

\* \* \* \* \*